United States Patent
Park et al.

(10) Patent No.: US 12,022,366 B2
(45) Date of Patent: Jun. 25, 2024

(54) USE-CASE-SPECIFIC WIRELESS COMMUNICATIONS-BASED RADAR REFERENCE SIGNALS

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Junyi Li, Franklin Park, NJ (US); Juan Montojo, San Diego, CA (US); Jing Sun, San Diego, CA (US); Xiaoxia Zhang, San Diego, CA (US); Peter Gaal, San Diego, CA (US); Taesang Yoo, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 17/329,109

(22) Filed: May 24, 2021

(65) Prior Publication Data

US 2021/0392478 A1    Dec. 16, 2021

Related U.S. Application Data

(60) Provisional application No. 63/038,033, filed on Jun. 11, 2020.

(51) Int. Cl.
*H04W 4/38* (2018.01)
*H04L 27/26* (2006.01)
(Continued)

(52) U.S. Cl.
CPC ............. *H04W 4/38* (2018.02); *H04L 27/261* (2013.01); *H04W 72/0446* (2013.01);
(Continued)

(58) Field of Classification Search
CPC . H04W 4/38; H04W 72/042; H04W 72/0453; H04W 72/046; H04L 72/261
See application file for complete search history.

(56) References Cited

U.S. PATENT DOCUMENTS

2008/0039098 A1\* 2/2008 Papasakellariou .. H04W 72/542
                                                                    455/442
2009/0268685 A1\* 10/2009 Chen ..................... H04L 5/0053
                                                                    370/329
(Continued)

FOREIGN PATENT DOCUMENTS

CN          109870684 A     6/2019
CN          110412557 A     11/2019
(Continued)

OTHER PUBLICATIONS

Adib F., "See Through Walls with Wi-Fi", Massachusetts Institute of Technology, Jun. 2013, pp. 1-62.
(Continued)

*Primary Examiner* — Brenda H Pham
(74) *Attorney, Agent, or Firm* — QUALCOMM Incorporated

(57) ABSTRACT

Disclosed are techniques for allocating resources for environment sensing. In an aspect, a base station transmits a first radar reference signal (RRS) on a first set of resources comprising first time resources, first frequency resources, first spatial resources, or any combination thereof, wherein the first set of resources is selected to enable a first user equipment (UE) to perform a first type of environment sensing, and transmits a second RRS on a second set of resources comprising second time resources, second frequency resources, second spatial resources, or any combination thereof, wherein the second set of resources is selected to enable a second UE to perform a second type of environment sensing, wherein the second set of resources is (Continued)

different from the first set of resources, and wherein the second type of environment sensing is different from the first type of environment sensing.

53 Claims, 13 Drawing Sheets

(51) Int. Cl.
    *H04W 72/044*     (2023.01)
    *H04W 72/0446*     (2023.01)
    *H04W 72/0453*     (2023.01)
    *H04W 72/23*     (2023.01)

(52) U.S. Cl.
    CPC ..... *H04W 72/0453* (2013.01); *H04W 72/046* (2013.01); *H04W 72/23* (2023.01)

(56) References Cited

U.S. PATENT DOCUMENTS

2011/0038344 A1* 2/2011 Chmiel ................ H04L 5/0051
                                                                           370/329
2017/0339717 A1* 11/2017 Futaki .................. H04W 72/23
2020/0107249 A1* 4/2020 Stauffer ................ H04W 48/14

FOREIGN PATENT DOCUMENTS

EP         2124071 B1     9/2010
WO     2020150283 A1     7/2020

OTHER PUBLICATIONS

Partial International Search Report—PCT/US2021/034088—ISA/EPO—dated Sep. 13, 2021.
Shi C., et al., "LPI-Based OFDM Radar Waveform Design in a Cooperative Radar-Communications System", 2019 IEEE International Conference on Signal, Information and Data Processing (ICSIDP), IEEE, Dec. 11, 2019 (Dec. 11, 2019), 4 Pages, XP033813620, DOI: 10.1109/ICSIDP47821.2019.9173499 [retrieved on Aug. 20, 2020] the Whole Document.
International Search Report and Written Opinion—PCT/US2021/034088—ISA/EPO—dated Nov. 4, 2021.

* cited by examiner

USE-CASE-SPECIFIC WIRELESS COMMUNICATIONS-BASED RADAR REFERENCE SIGNALS

CROSS-REFERENCE TO RELATED APPLICATIONS

The present application for patent claims the benefit of U.S. Provisional Application No. 63/038,033, entitled "USE-CASE-SPECIFIC WIRELESS COMMUNICATIONS-BASED RADAR REFERENCE SIGNALS," filed Jun. 11, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of allocating resources for environment sensing performed by a base station includes transmitting, to a first user equipment (UE), a first radar reference signal (RRS) on a first set of resources, the first set of resources comprising first time resources, first frequency resources, first spatial resources, or any combination thereof, wherein the first set of resources is selected to enable the first UE to perform a first type of environment sensing based on the first RRS; and transmitting, to a second UE, a second RRS on a second set of resources, the second set of resources comprising second time resources, second frequency resources, second spatial resources, or any combination thereof, wherein the second set of resources is selected to enable the second UE to perform a second type of environment sensing based on the second RRS, wherein the second set of resources is different from the first set of resources, and wherein the second type of environment sensing is different from the first type of environment sensing.

In an aspect, a method of allocating resources for environment sensing performed by a base station includes transmitting, to a first user equipment (UE), a first resource configuration for a first set of resources for a first radar reference signal (RRS) to enable the first UE to transmit the first RRS on the first set of resources, the first set of resources comprising first time resources, first frequency resources, first spatial resources, or any combination thereof, wherein the first set of resources is selected to enable the base station to perform a first type of environment sensing based on the first RRS; and transmitting, to a second UE, a second resource configuration for a second set of resources for a second RRS to enable the second UE to transmit the second RRS on the second set of resources, the second set of resources comprising second time resources, second frequency resources, second spatial resources, or any combination thereof, wherein the second set of resources is selected to enable the base station to perform a second type of environment sensing based on the second RRS, wherein the second set of resources is different from the first set of resources, and wherein the second type of environment sensing is different from the first type of environment sensing.

In an aspect, a method of environment sensing performed by a UE includes receiving a first resource configuration indicating a first set of resources for a first radar reference signal (RRS), the first set of resources comprising first time resources, first frequency resources, first spatial resources, or any combination thereof, wherein the first set of resources is selected for a first type of environment sensing based on the first RRS; and receiving a second resource configuration indicating a second set of resources for a second RRS, the second set of resources comprising second time resources, second frequency resources, second spatial resources, or any combination thereof, wherein the second set of resources is selected for a second type of environment sensing based on the second RRS, wherein the second set of resources is different from the first set of resources, and wherein the second type of environment sensing is different from the first type of environment sensing.

In an aspect, a base station includes a memory; at least one transceiver; and at least one processor communicatively coupled to the memory and the at least one transceiver, the at least one processor configured to: transmit, via the at least one transceiver, to a first user equipment (UE), a first radar reference signal (RRS) on a first set of resources, the first set of resources comprising first time resources, first frequency resources, first spatial resources, or any combination thereof, wherein the first set of resources is selected to enable the first UE to perform a first type of environment sensing based on the first RRS; and transmit, via the at least one transceiver, to a second UE, a second RRS on a second set of resources, the second set of resources comprising second time resources, second frequency resources, second spatial resources, or any combination thereof, wherein the second set of resources is selected to enable the second UE to perform a second type of environment sensing based on the second RRS, wherein the second set of resources is different from the first set of resources, and wherein the second type of environment sensing is different from the first type of environment sensing.

In an aspect, a base station includes a memory; at least one transceiver; and at least one processor communicatively coupled to the memory and the at least one transceiver, the at least one processor configured to: transmit, via the at least one transceiver, to a first user equipment (UE), a first resource configuration for a first set of resources for a first radar reference signal (RRS) to enable the first UE to transmit the first RRS on the first set of resources, the first set of resources comprising first time resources, first frequency resources, first spatial resources, or any combination thereof, wherein the first set of resources is selected to enable the base station to perform a first type of environment sensing based on the first RRS; and transmit, via the at least one transceiver, to a second UE, a second resource configuration for a second set of resources for a second RRS to enable the second UE to transmit the second RRS on the second set of resources, the second set of resources comprising second time resources, second frequency resources, second spatial resources, or any combination thereof, wherein the second set of resources is selected to enable the base station to perform a second type of environment sensing based on the second RRS, wherein the second set of resources is different from the first set of resources, and wherein the second type of environment sensing is different from the first type of environment sensing.

In an aspect, a user equipment (UE) includes a memory; at least one transceiver; and at least one processor communicatively coupled to the memory and the at least one transceiver, the at least one processor configured to: receive, via the at least one transceiver, a first resource configuration indicating a first set of resources for a first radar reference signal (RRS), the first set of resources comprising first time resources, first frequency resources, first spatial resources, or any combination thereof, wherein the first set of resources is selected for a first type of environment sensing based on the first RRS; and receive, via the at least one transceiver, a second resource configuration indicating a second set of resources for a second RRS, the second set of resources comprising second time resources, second frequency resources, second spatial resources, or any combination thereof, wherein the second set of resources is selected for a second type of environment sensing based on the second RRS, wherein the second set of resources is different from the first set of resources, and wherein the second type of environment sensing is different from the first type of environment sensing.

In an aspect, a base station includes means for transmitting, to a first user equipment (UE), a first radar reference signal (RRS) on a first set of resources, the first set of resources comprising first time resources, first frequency resources, first spatial resources, or any combination thereof, wherein the first set of resources is selected to enable the first UE to perform a first type of environment sensing based on the first RRS; and means for transmitting, to a second UE, a second RRS on a second set of resources, the second set of resources comprising second time resources, second frequency resources, second spatial resources, or any combination thereof, wherein the second set of resources is selected to enable the second UE to perform a second type of environment sensing based on the second RRS, wherein the second set of resources is different from the first set of resources, and wherein the second type of environment sensing is different from the first type of environment sensing.

In an aspect, a base station includes means for transmitting, to a first user equipment (UE), a first resource configuration for a first set of resources for a first radar reference signal (RRS) to enable the first UE to transmit the first RRS on the first set of resources, the first set of resources comprising first time resources, first frequency resources, first spatial resources, or any combination thereof, wherein the first set of resources is selected to enable the base station to perform a first type of environment sensing based on the first RRS; and means for transmitting, to a second UE, a second resource configuration for a second set of resources for a second RRS to enable the second UE to transmit the second RRS on the second set of resources, the second set of resources comprising second time resources, second frequency resources, second spatial resources, or any combination thereof, wherein the second set of resources is selected to enable the base station to perform a second type of environment sensing based on the second RRS, wherein the second set of resources is different from the first set of resources, and wherein the second type of environment sensing is different from the first type of environment sensing.

In an aspect, a user equipment (UE) includes means for receiving a first resource configuration indicating a first set of resources for a first radar reference signal (RRS), the first set of resources comprising first time resources, first frequency resources, first spatial resources, or any combination thereof, wherein the first set of resources is selected for a first type of environment sensing based on the first RRS; and means for receiving a second resource configuration indicating a second set of resources for a second RRS, the second set of resources comprising second time resources, second frequency resources, second spatial resources, or any combination thereof, wherein the second set of resources is selected for a second type of environment sensing based on the second RRS, wherein the second set of resources is different from the first set of resources, and wherein the second type of environment sensing is different from the first type of environment sensing.

In an aspect, a non-transitory computer-readable medium stores computer-executable instructions that, when executed by a base station, cause the base station to: transmit, to a first user equipment (UE), a first radar reference signal (RRS) on a first set of resources, the first set of resources comprising first time resources, first frequency resources, first spatial resources, or any combination thereof, wherein the first set of resources is selected to enable the first UE to perform a first type of environment sensing based on the first RRS; and transmit, to a second UE, a second RRS on a second set of resources, the second set of resources comprising second time resources, second frequency resources, second spatial resources, or any combination thereof, wherein the second set of resources is selected to enable the second UE to perform a second type of environment sensing based on the second RRS, wherein the second set of resources is different from the first set of resources, and wherein the second type of environment sensing is different from the first type of environment sensing.

In an aspect, a non-transitory computer-readable medium stores computer-executable instructions that, when executed by a base station, cause the base station to: transmit, to a first user equipment (UE), a first resource configuration for a first set of resources for a first radar reference signal (RRS) to enable the first UE to transmit the first RRS on the first set of resources, the first set of resources comprising first time resources, first frequency resources, first spatial resources, or any combination thereof, wherein the first set of resources is selected to enable the base station to perform a first type of environment sensing based on the first RRS; and transmit, to a second UE, a second resource configuration for a second set of resources for a second RRS to enable the second UE to transmit the second RRS on the second set of resources, the second set of resources comprising second time resources, second frequency resources, second spatial resources, or any combination thereof, wherein the second set of resources is selected to enable the base station to perform a second type of environment sensing based on the second RRS, wherein the second set of resources is different from the first set of resources, and wherein the second type of environment sensing is different from the first type of environment sensing.

In an aspect, a non-transitory computer-readable medium stores computer-executable instructions that, when executed by a user equipment (UE), cause the UE to: receive a first resource configuration indicating a first set of resources for a first radar reference signal (RRS), the first set of resources comprising first time resources, first frequency resources, first spatial resources, or any combination thereof, wherein the first set of resources is selected for a first type of environment sensing based on the first RRS; and receive a second resource configuration indicating a second set of resources for a second RRS, the second set of resources comprising second time resources, second frequency resources, second spatial resources, or any combination thereof, wherein the second set of resources is selected for a second type of environment sensing based on the second RRS, wherein the second set of resources is different from the first set of resources, and wherein the second type of environment sensing is different from the first type of environment sensing.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
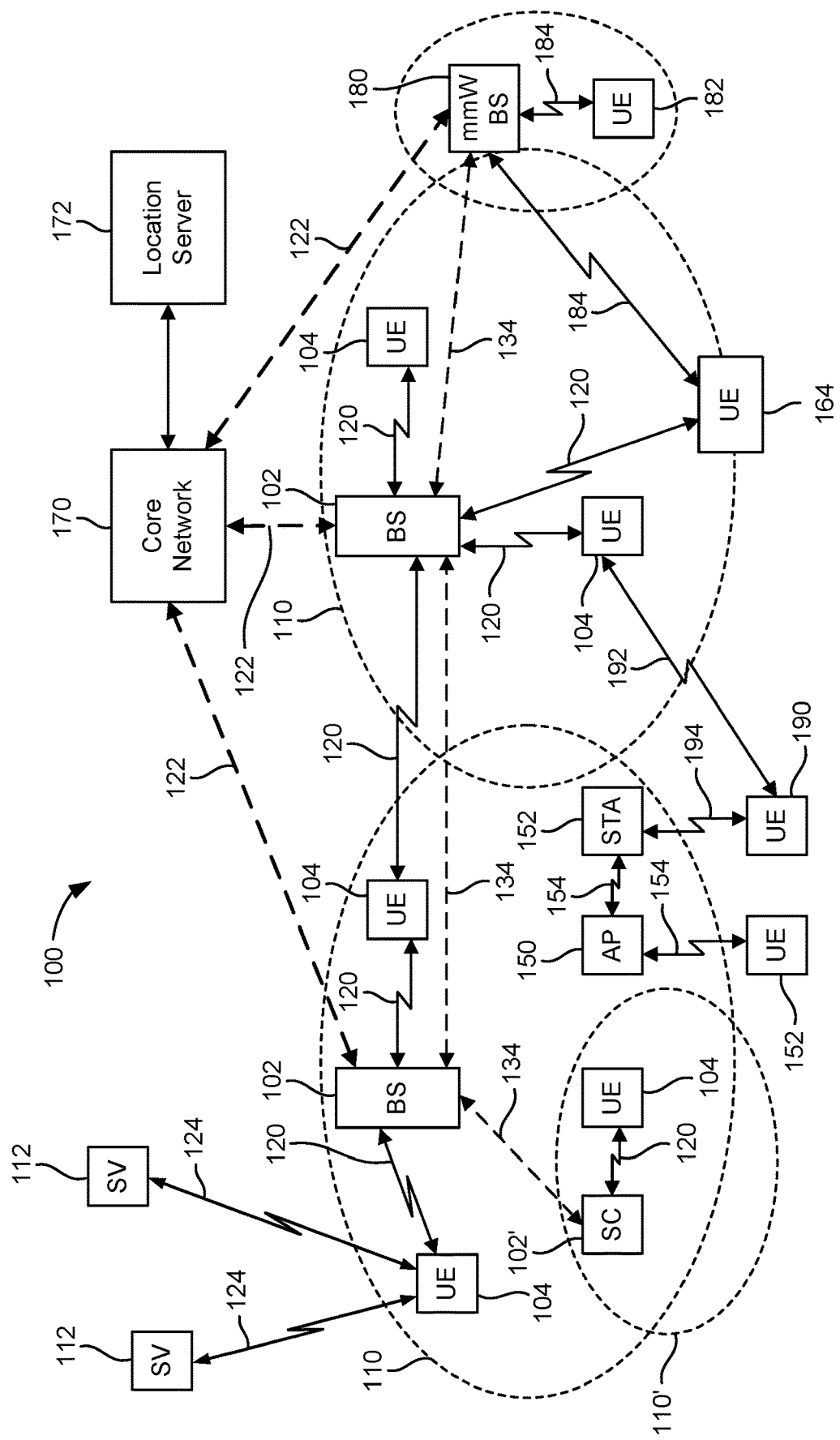
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
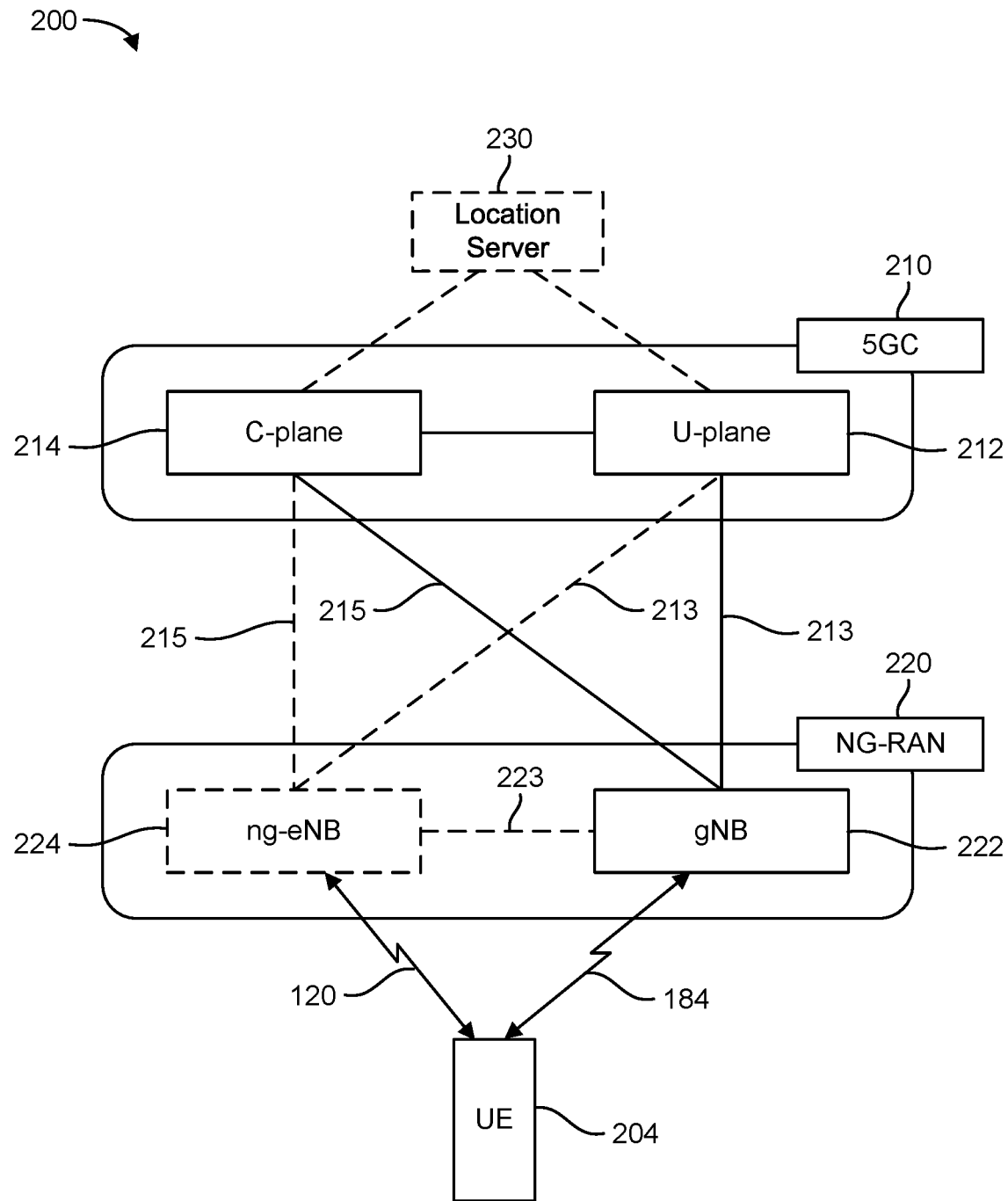
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
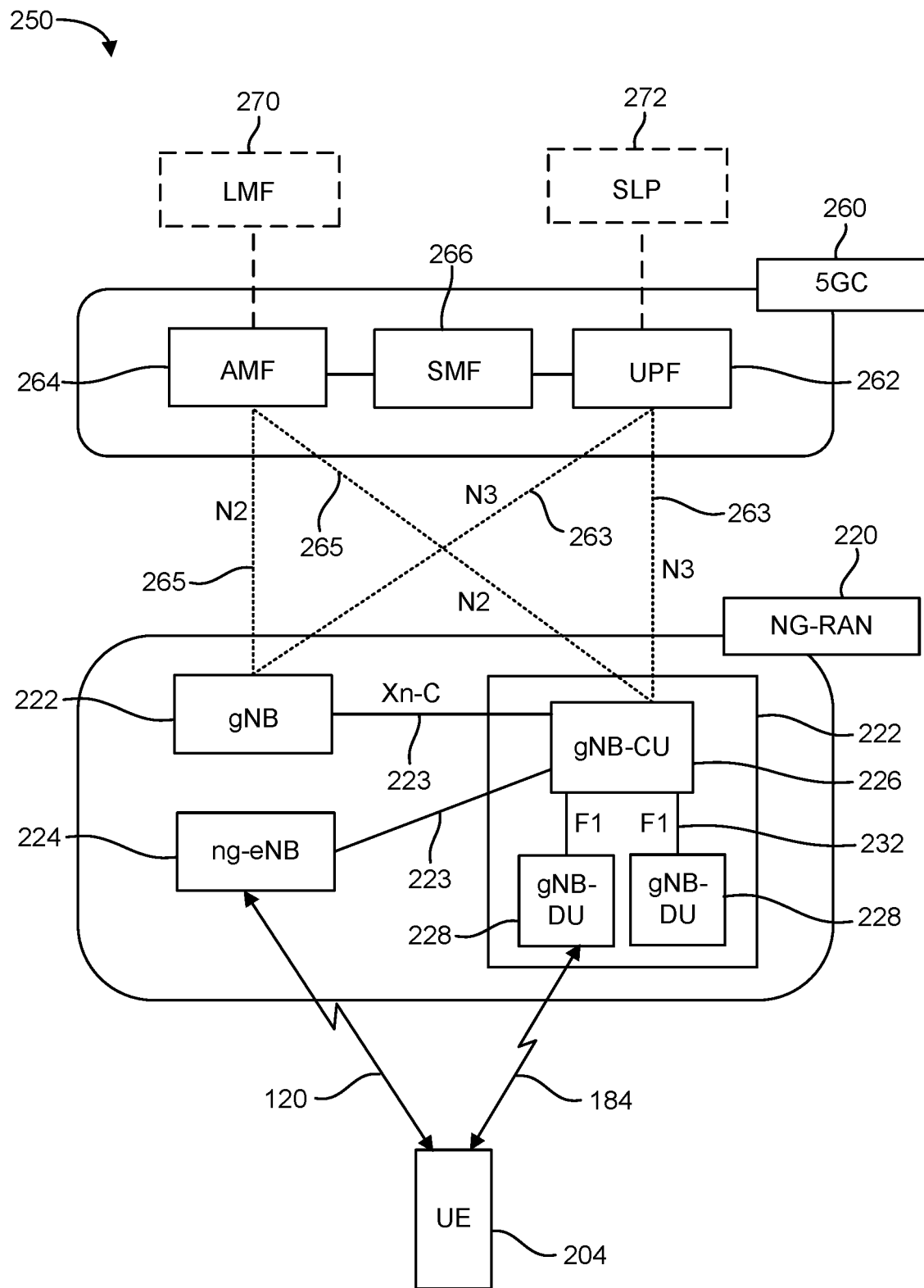

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
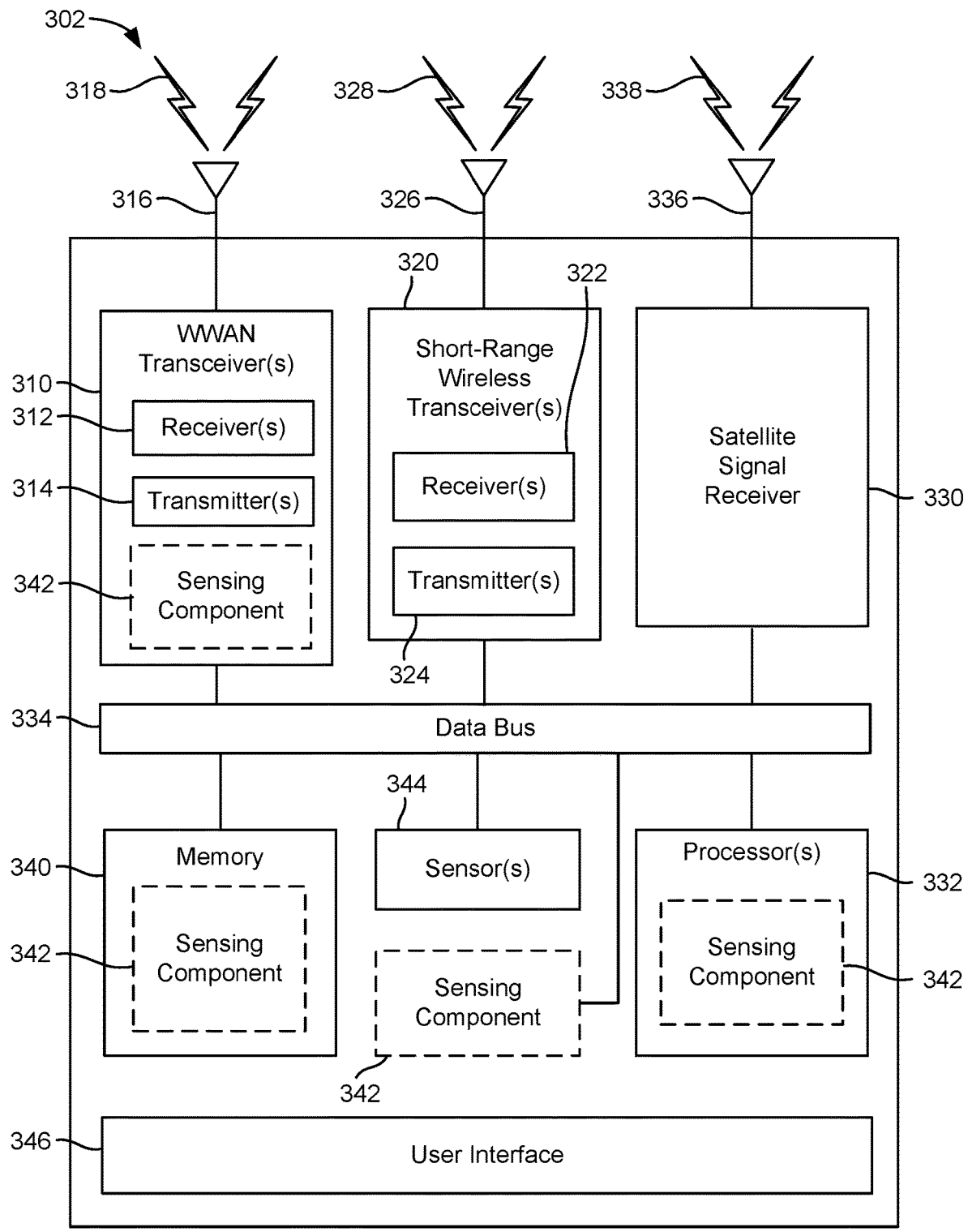
FIGS. 3A, 3B, and 3C are simplified block diagrams of several sample aspects of components that may be employed in a user equipment (UE), a base station, and a network entity, respectively, and configured to support communications as taught herein.
Figure 3B:
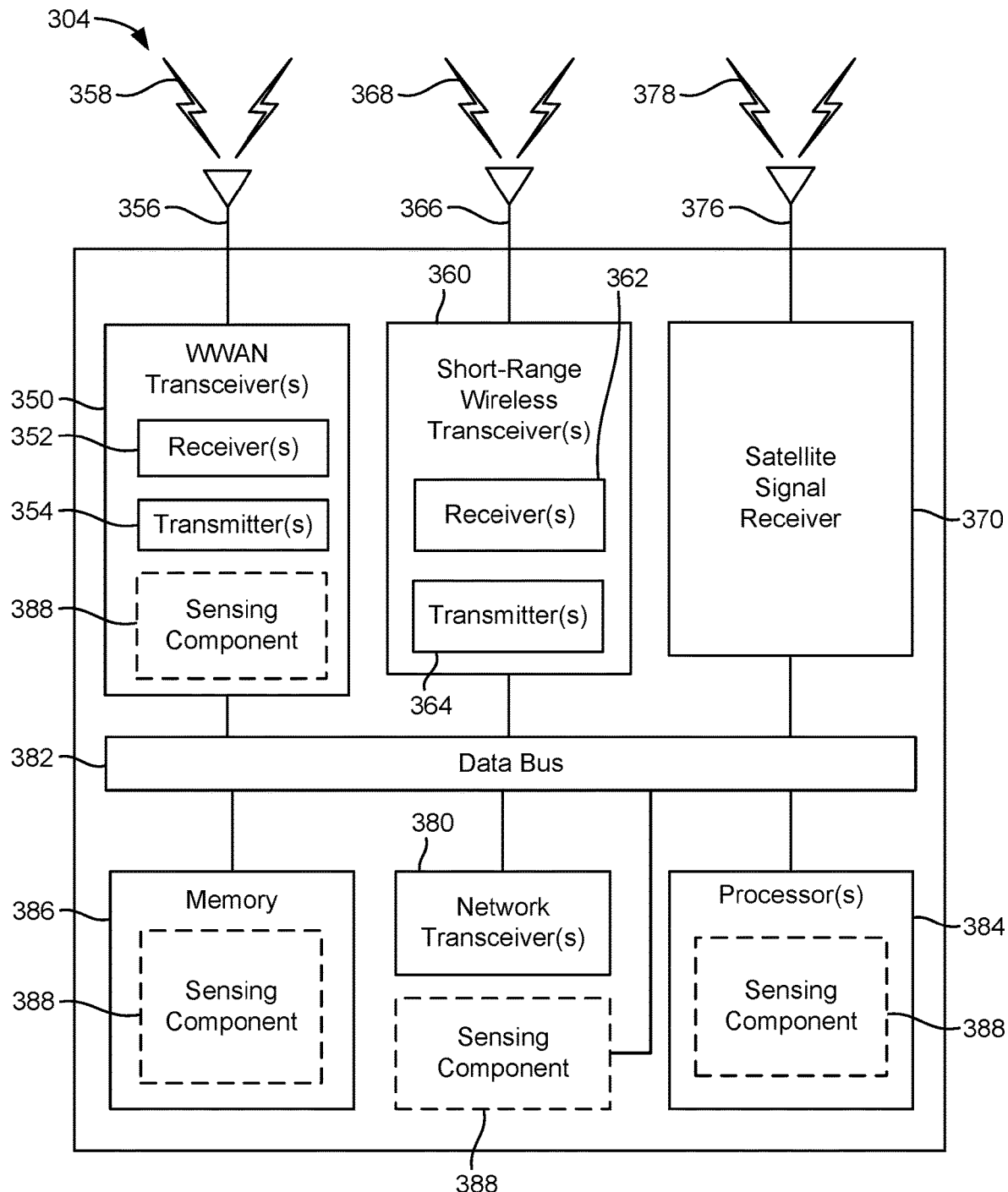
Figure 3C:
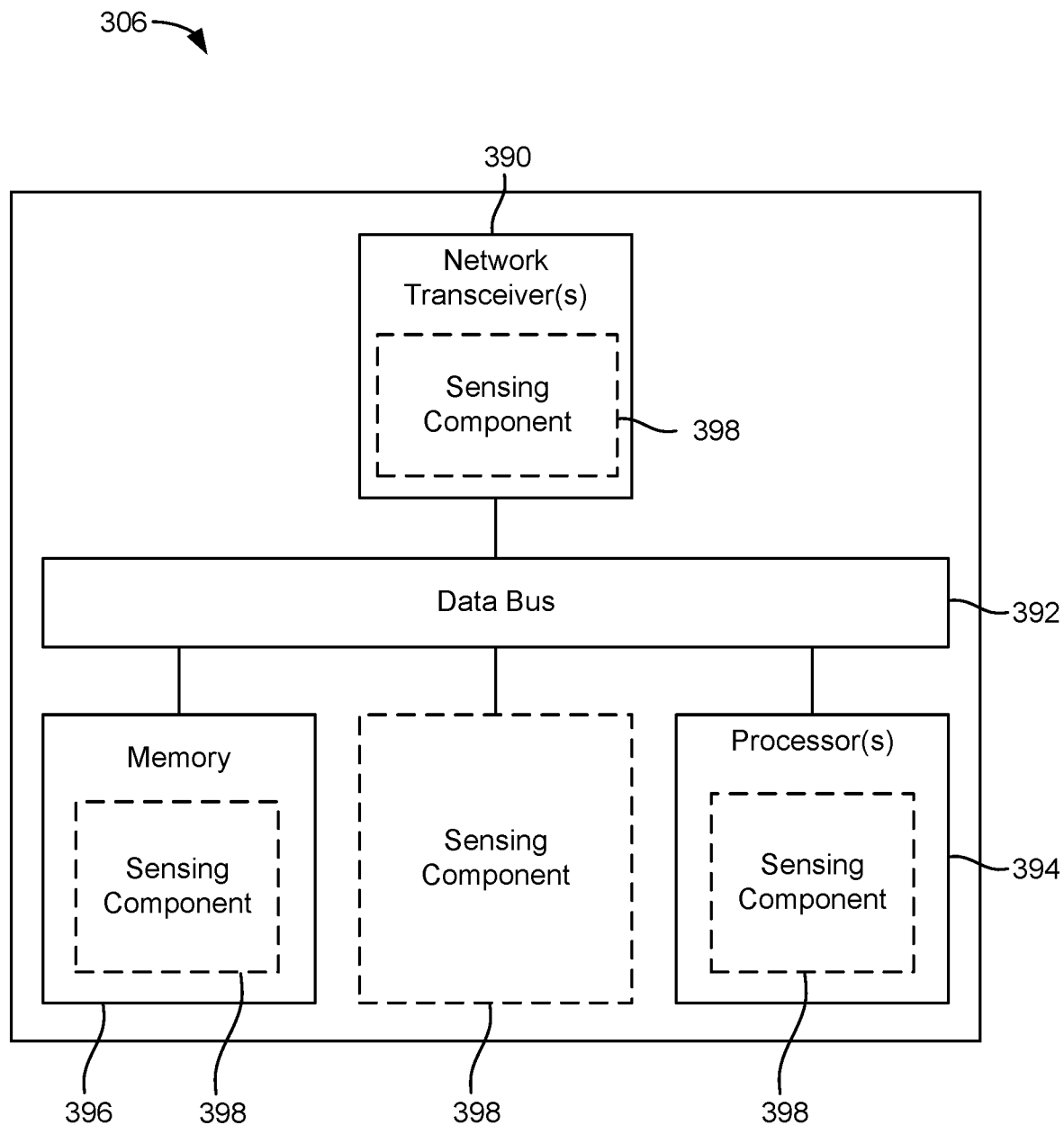

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sensing component 342, 388, and 398, respectively. The sensing component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sensing component 342, 388, and 398 may be external to the processors 332, 384, and 394 (e.g., part of a modem processing system, integrated with another processing system, etc.). Alternatively, the sensing component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sensing component 342, which may be, for example, part of the one or more WWAN transceivers 310, the memory 340, the one or more processors 332, or any combination thereof, or may be a standalone component. FIG. 3B illustrates possible locations of the sensing component 388, which may be, for example, part of the one or more WWAN transceivers 350, the memory 386, the one or more processors 384, or any combination thereof, or may be a standalone component. FIG. 3C illustrates possible locations of the sensing component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sensing component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
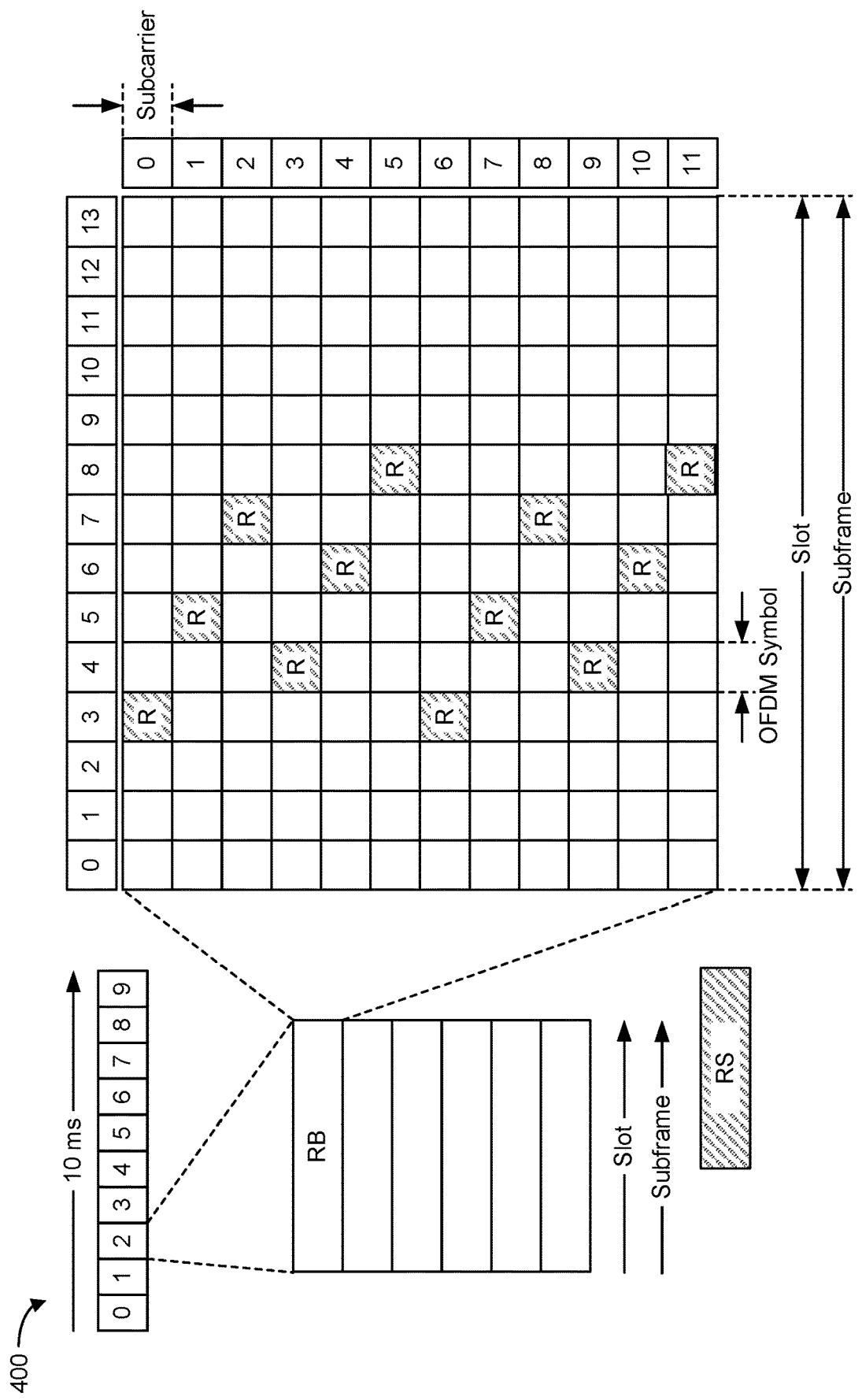
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying reference signals (labeled "R").

Wireless communication signals (e.g., RF signals configured to carry OFDM symbols) transmitted between a UE and a base station can be reused for environment sensing. Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Using mmW RF signals for environment sensing can allow a sensing component (e.g., sensing component 342, 388) to be incorporated into a compact form factor, such as a handheld device. Such a sensing component (e.g., chip) may be a DSP, an SoC, or other processing component that can be integrated into another device (a host device), such as a UE, a base station, an IoT device, a factory automation machine, or the like. In an aspect, a sensing component may be, or may be incorporated into, a modem for wireless communication, such as a 5G modem, a 60 GHz WLAN modem, or the like. A device containing a sensing component may be referred to as a host device, an environment sensing device, a sensing device, and the like.

Possible use cases of RF sensing include health monitoring use cases, such as heartbeat detection, respiration rate monitoring, and the like, gesture recognition use cases, such as human activity recognition, keystroke detection, sign language recognition, and the like, contextual information acquisition use cases, such as location detection and/or tracking, direction finding, range estimation, and the like, and automotive radar use cases, such as smart cruise control, collision avoidance, and the like.

Figure 5:
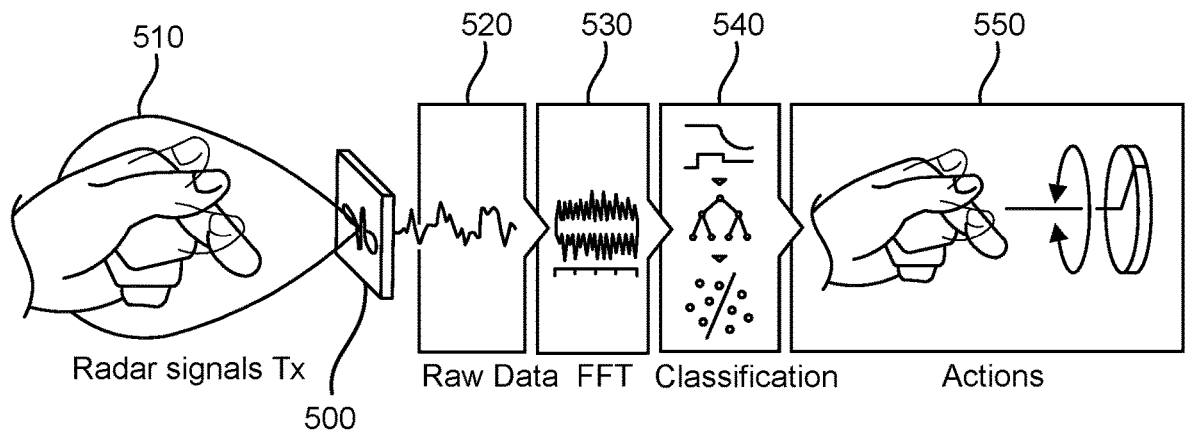
FIG. 5 illustrates the general process of transmitting and collecting millimeter wave (mmW) radio frequency (RF) signal data, according to aspects of the disclosure.

FIG. 5 illustrates the general process of transmitting and collecting mmW RF signal data, according to aspects of the disclosure. In the example of FIG. 5, at stage 510, a sensing component 500 (e.g., sensing component 342, 388) transmits mmW RF signals with a predefined waveform, such as a frequency modulated continuous wave (FMCW). In FMCW techniques, an RF signal with a known stable frequency continuous wave (i.e., an RF signal with constant amplitude and frequency) varies up and down in frequency over a fixed period of time according to a modulating signal. The mmW RF signals may be transmitted in a beam (e.g., using beamforming) and may reflect off of nearby objects, such as a human face or hand, within the beam. A portion of the transmitted RF signals is reflected back towards the sensing component 500. At stage 520, the sensing component 500 receives/detects the RF return data (i.e., the reflections of the transmitted mmW RF signals).

At stage 530, the sensing component 500 performs a fast Fourier transform (FFT) on the raw RF return data. An FFT converts an RF signal from its original domain (here, time) to a representation in the frequency domain, and vice versa. Frequency differences between the received RF signal and the transmitted RF signal increase with delay (i.e., the time between transmission and reception), and hence, with distance (range). The sensing component 500 correlates reflected RF signals with transmitted RF signals to obtain range, Doppler, and angle information associated with the target object. The range is the distance to the object, the Doppler is the speed of the object, and the angle is the horizontal and/or vertical distance between the detected object and a reference RF ray emitted by the sensing component 500, such as the initial RF ray of a beam sweep.

From the determined properties of the reflected RF signals, the sensing component 500 can determine information about the detected object's characteristics and behaviors, including the size, shape, orientation, material, distance, and velocity of the object. At stage 540, the sensing component 500 classifies the detected object and/or motion of the detected object based on the determined characteristics. For example, the sensing component 500 can use machine learning to classify the detected object as a hand and the motion of the detected object as a twisting motion. At stage 550, based on the classification at stage 540, the sensing component 500 can cause the host device to perform an action, such as turning a virtual dial on the screen of the host device as in the example of FIG. 5.

Figure 6:
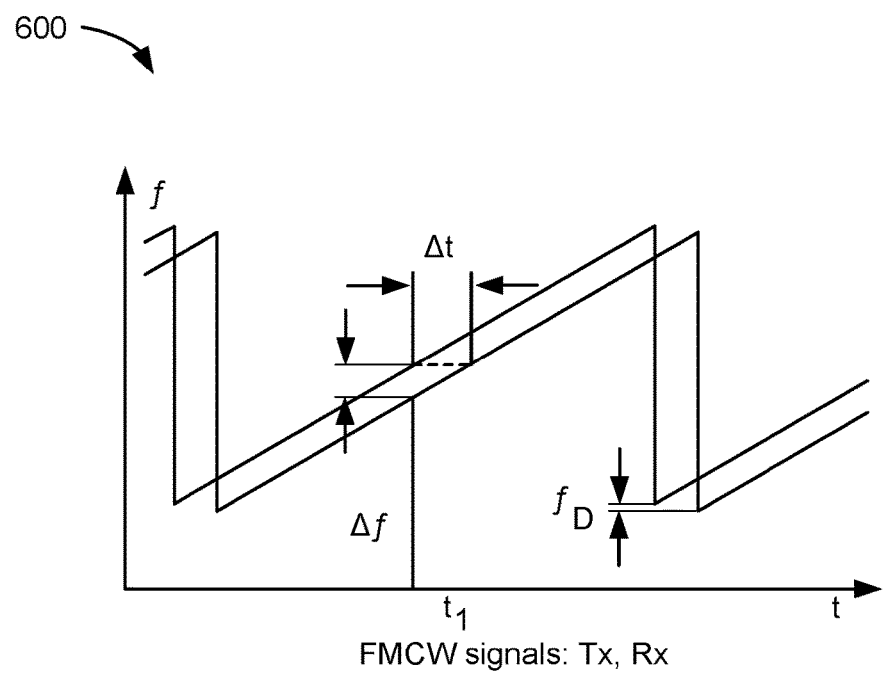
FIG. 6 is a graph illustrating an example waveform of transmitted and received frequency modulated continuous wave (FMCW) RF signals, according to aspects of the disclosure.

FIG. 6 is a graph 600 illustrating an example waveform of a transmitted and received FMCW RF signals, according to aspects of the disclosure. FIG. 6 illustrates an example of a sawtooth modulation, which is a common FMCW waveform where range is desired. Range information is mixed with the Doppler velocity using this technique. Modulation can be turned off on alternate scans to identify velocity using unmodulated carrier frequency shift. This allows range and velocity to be determined with one radar set.

As shown in FIG. 6, the received RF waveform (the lower diagonal lines) is simply a delayed replica of the transmitted RF waveform (the upper diagonal lines). The frequency at which the waveforms are transmitted is used to down-convert the received RF waveform to baseband (a signal that has a near-zero frequency range), and the amount of frequency shift between the transmitted RF waveform and the reflected (received) RF waveform increases with the time delay between them. The time delay is thus a measure of range to the target object. For example, a small frequency spread is produced by reflections from a nearby object, whereas a larger frequency spread is produced by reflections from a further object, thereby resulting in a longer time delay between the transmitted and received RF waveforms.

Figure 7:
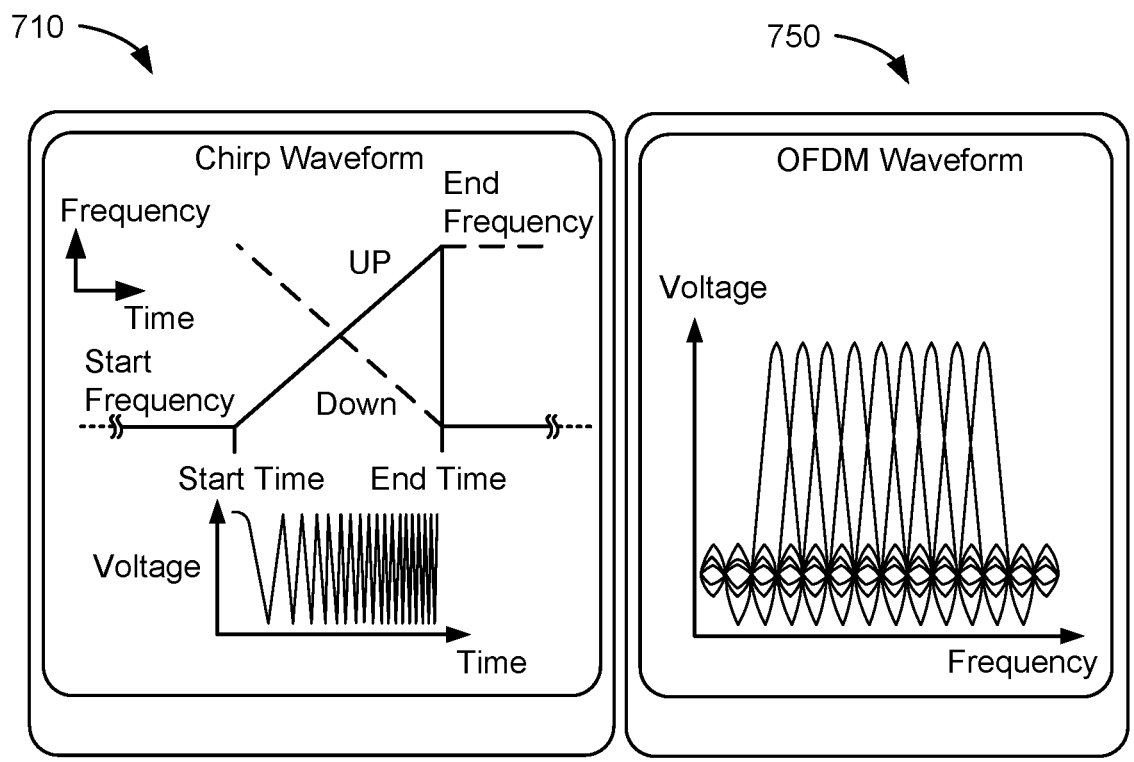
FIG. 7 illustrates a comparison between a simple chirp waveform and a mmW orthogonal frequency division multiplexing (OFDM) waveform, according to aspects of the disclosure.

The present disclosure provides techniques for configuring an OFDM waveform for use as a radar signal for different environment sensing use cases. Like conventional radar (e.g., FMCW radar), an OFDM-based radar signal can be used to estimate the range (distance), velocity (Doppler), and angle (angle of arrival (AoA)) of a target object. FMCW radar signals are typically formed as a simple chirp waveform. A chirp waveform can be used when the only purpose of the transmitted RF signal is for environmental sensing. However, due to the short wavelength, a more complex OFDM waveform in a mmW frequency band can be used for both communication (e.g., over a 5G network) and environment sensing. FIG. 7 illustrates a comparison between a simple chirp waveform (as used in FMCW radar techniques) and a more complex mmW OFDM waveform, according to aspects of the disclosure. Specifically, FIG. 7 illustrates a diagram 710 of an example chirp waveform and a diagram 750 of an example mmW OFDM waveform.

To use an OFDM waveform as a radar signal for environment sensing, specific reference signals, referred to herein as radar reference signals (RRS), may be needed. The radar performance (e.g., resolution and maximum values of range, velocity, and/or angle) may depend on the RRS design. More specifically, a common RRS may not be enough to support all possible use cases; rather, a specific RRS may be needed for each use case.

Figure 8:
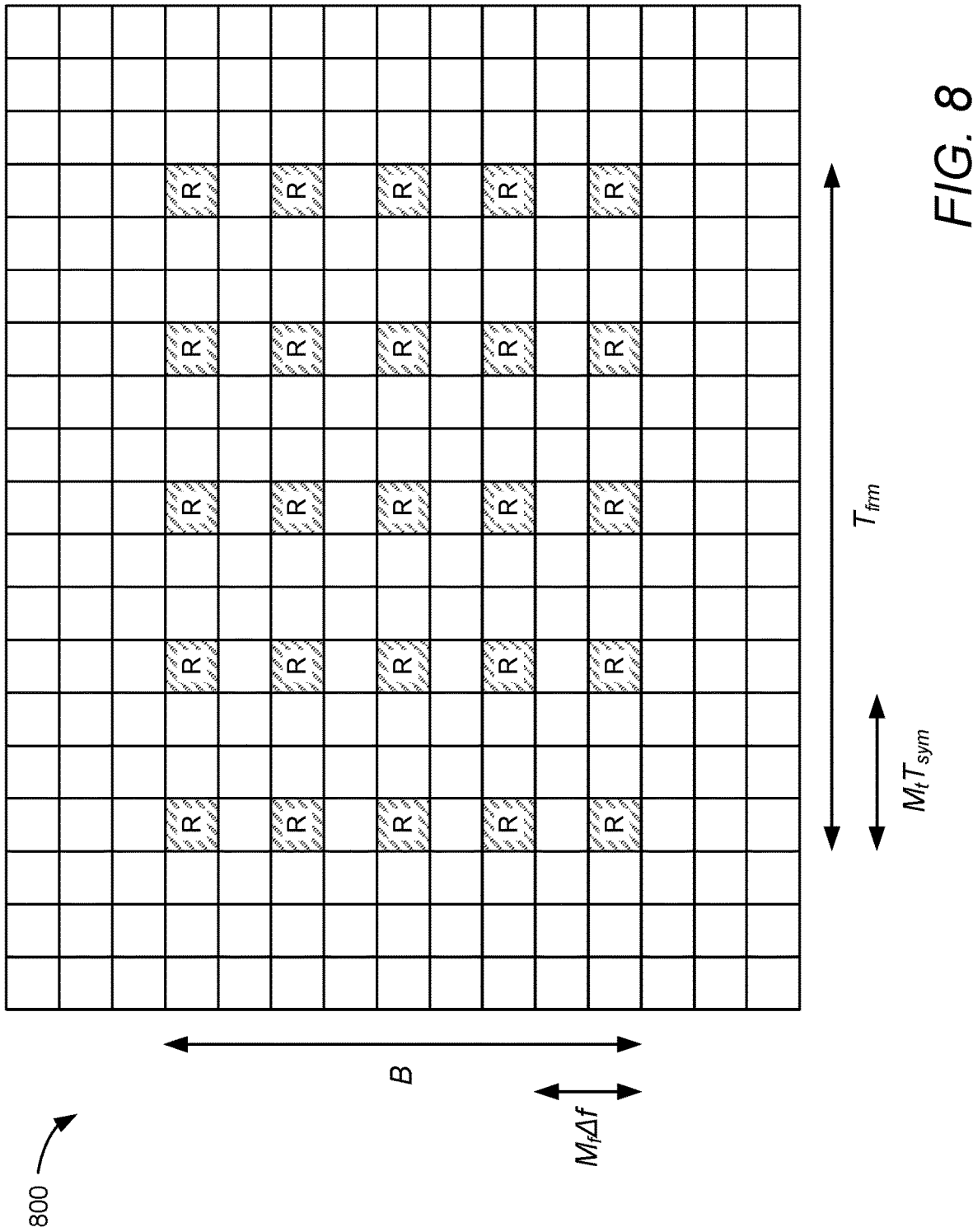
FIG. 8 is a diagram of an example frame structure in which radar reference signal (RRS) are transmitted, according to aspects of the disclosure.

FIG. 8 is a diagram of an example frame structure 800 in which RRS are transmitted, according to aspects of the disclosure. In the example of FIG. 8, $\Delta f$ is the subcarrier spacing and $T_{sym}$ is the length of a symbol. Thus, RRS are transmitted on every $M_f$-th subcarrier (denoted $M_f \Delta f$) within a bandwidth range B and every $M_t$-th symbol within a time period $T_{frm}$ (denoted $M_t T_{frm}$). In the example of FIG. 8, REs carrying RRS are shaded and labeled "R." The parameters B, $T_{frm}$, $M_f$, $M_t$, $\Delta f$, $T_{sym}$, and $f_c$ (carrier frequency) of an RRS are related to the range and velocity resolution, as shown in Table 1 below:

TABLE 1

| | OFDM-Based Radar | Related Design Parameters |
|---|---|---|
| Range Resolution | $\Delta R = \dfrac{c}{2B}$ | B |
| Maximum Measurable Range | $R_{max} = \dfrac{c}{2M_f \Delta f}$ | $M_f, \Delta f$ |
| Velocity Resolution | $\Delta v = \dfrac{\lambda}{2T_{frm}}$ | $T_{frm}, f_c$ |
| Maximum Measurable Velocity | $|v_{max}| = \dfrac{\lambda}{4M_t T_{sym}}$ | $M_t, T_{sym}, f_c$ |

In Table 1 above, c is the speed of light, $\lambda$ is the wavelength of the RRS, v is the velocity, and R is the range.

The following are examples of use cases and the corresponding requirements for RRS. For a gesture recognition use case, coarse range/velocity estimation may be enough. That is, it may be sufficient to be able to detect a pattern of movement relative to the current position of the target object (e.g., a user's hand or head). In this case, a low density (i.e., sparse) RRS with a short wavelength and narrow bandwidth may be sufficient to provide the necessary range and velocity resolution. That is, a larger value of $M_f$, a smaller value of $f_c$, and a smaller value of B may be appropriate. In addition, it may be beneficial for the RRS to be UE-specific. For example, a UE may transmit a request to its serving base station requesting the base station to transmit RRS to the UE (referred to as on-demand RRS). The request may indicate the use case for which the UE is requesting the RRS so that the base station knows how to configure the RRS (here, gesture recognition). The UE can then measure the received RRS to perform gesture recognition.

For a vibration detection use case, such as for respiration monitoring of a human, accurate Doppler estimation may be important, whereas accurate range estimation may not be. In this case, a high-density RRS with a long duration in the time domain may be beneficial. That is, a larger value of $T_{frm}$ and a smaller value of $M_t$ may be beneficial. In addition, it may be beneficial for the RRS to be UE-specific. For example, as above, a UE may transmit a request to its serving base station requesting the base station to transmit RRS to the UE (referred to as on-demand RRS. The request may indicate the use case for which the UE is requesting the RRS (here, vibration detection). The UE can then measure the received RRS to perform vibration detection.

For a location detection use case, such as for object detection, accurate range estimation may be important, whereas accurate Doppler estimation may not be. In this case, a high-density wideband RRS in the frequency domain may be beneficial. That is, a high value of B and a low value of $M_f$ may be beneficial. In addition, cell-specific RRS (i.e., transmitted to all UEs in a cell of a base station) may be beneficial in this case. For example, the base station may notify all UEs in a cell that it will be transmitting RRS for object detection purposes and configure the UEs to measure the RRS and report the measurements back to the base station, or perform object detection themselves.

As shown in the above, different values of the parameters B, $T_{frm}$, $M_f$, $M_t$, $\Delta f$, $T_{sym}$, and $f_c$ can configure an RRS for different use cases. Accordingly, the present disclosure provides techniques to enable a base station to configure different RRS for different use cases.

In an aspect, the RRS can be either cell-specific or UE-specific, depending on the use case, as described above. The RRS may also be downlink or uplink. For example, the base station can configure UE-specific RRS and broadcast the RRS to all UEs in the cell, or specific UEs in the cell, or in specific directions (e.g., using spatial beamforming). As another example, the base station can configure UE-specific RRS and send the RRS configuration to the UE (e.g., as an uplink grant). The UE can then transmit RRS on uplink resources according to the received RRS configuration.

In an aspect, the RRS configuration can be triggered by a UE or a base station. As a first option, the base station can configure RRS based on the base station's decision to trigger/transmit RRS. Alternatively, a UE may request RRS for a specific use case, and may even indicate the resources on which the RRS should be transmitted. As a second option, the UE can configure RRS based on the UE's decision to trigger/transmit RRS to the base station. In this case, the UE can send a MAC control element (MAC-CE) or RRC message to the serving base station to indicate its decision to trigger RRS and the resources on which it will be transmitting the RRS.

In an aspect, the RRS transmission can be periodic or aperiodic. As a first option, an RRS configuration can indicate that RRS transmission is periodic and indicate the periodicity. As a second option, an RRS configuration can indicate that RRS transmission is aperiodic.

An RRS configuration may include the bandwidth (B) of the RRS (e.g., the number of subcarriers or REs), the duration ($T_{frm}$) in the time domain (e.g., the number of OFDM symbols, slots, milliseconds, etc.), the RRS density in the frequency domain ($M_f$) and/or time domain ($M_t$), the periodicity of the RRS, the time offset (e.g., four symbols in the example of FIG. 8), the frequency offset (e.g., four subcarriers in the example of FIG. 8), the power boosting value, and/or the like.

A base station or UE may perform object detection, vibration detection, gesture recognition, etc. based on measurements of the RRS, the locations of the base station and the UE, the angle of the transmit and receive beams (where the base station and/or UE use beamforming), and/or the like. In addition, where the UE is measuring downlink RRS, it may report those measurements to the base station or other network entity for the base station to perform the object detection, vibration detection, gesture recognition, etc. Alternatively, the UE may perform those determinations locally.

Figure 9:
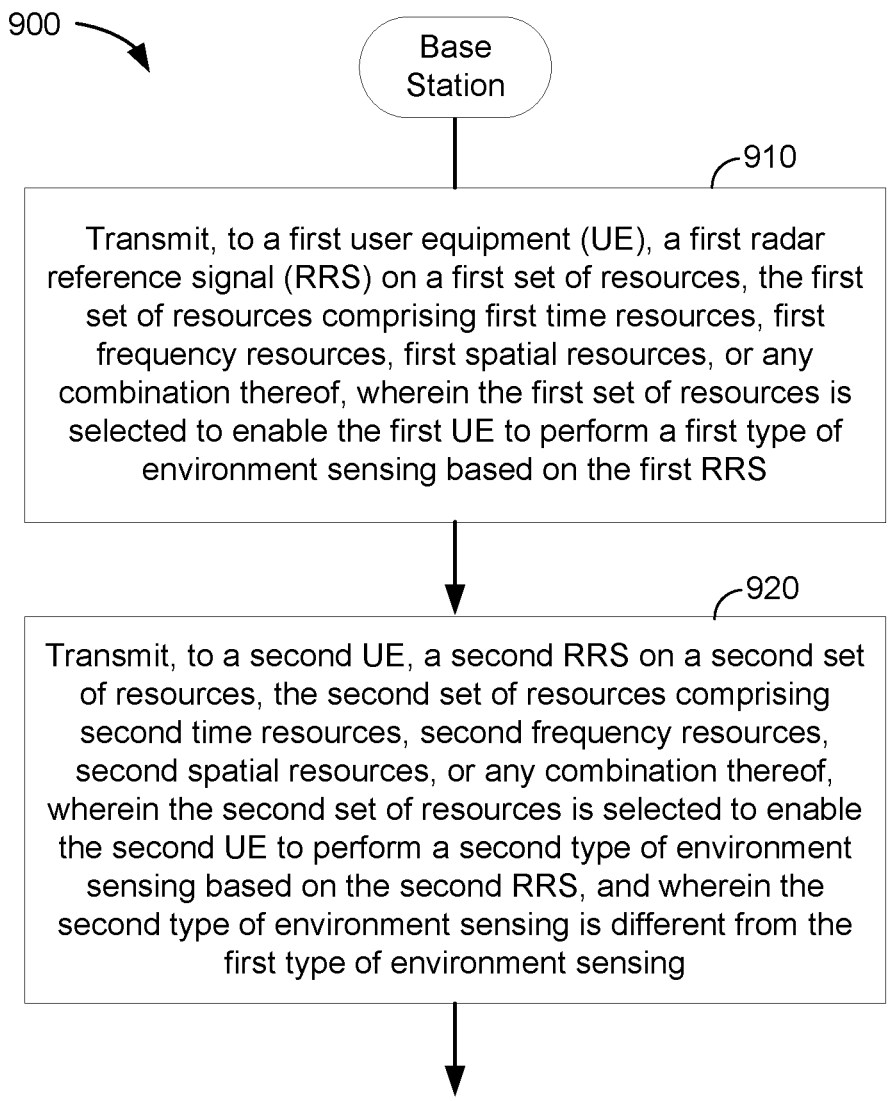
FIGS. 9 and 10 illustrate example methods of allocating resources for environment sensing, according to aspects of the disclosure.

FIG. 9 illustrates an example method 900 of allocating resources for environment sensing, according to aspects of the disclosure. In an aspect, method 900 may be performed by a base station (e.g., any of the base stations described herein).

At 910, the base station transmits, to a first UE (e.g., any of the UEs described herein), a first RRS on a first set of resources, the first set of resources comprising first time resources, first frequency resources, first spatial resources, or any combination thereof, wherein the first set of resources is selected to enable the first UE to perform a first type of environment sensing based on the first RRS. In an aspect, operation 910 may be performed by the one or more WWAN transceivers 350, the one or more processors 384, memory 386, and/or sensing component 388, any or all of which may be considered means for performing this operation.

At 920, the base station transmits, to a second UE (e.g., any of the UEs described herein), a second RRS on a second set of resources, the second set of resources comprising second time resources, second frequency resources, second spatial resources, or any combination thereof, wherein the second set of resources is selected to enable the second UE to perform a second type of environment sensing based on the second RRS, wherein the second set of resources is different from the first set of resources, and wherein the second type of environment sensing is different from the first type of environment sensing. In an aspect, operation 920 may be performed by the one or more WWAN transceivers 350, the one or more processors 384, memory 386, and/or sensing component 388, any or all of which may be considered means for performing this operation.

Figure 10:
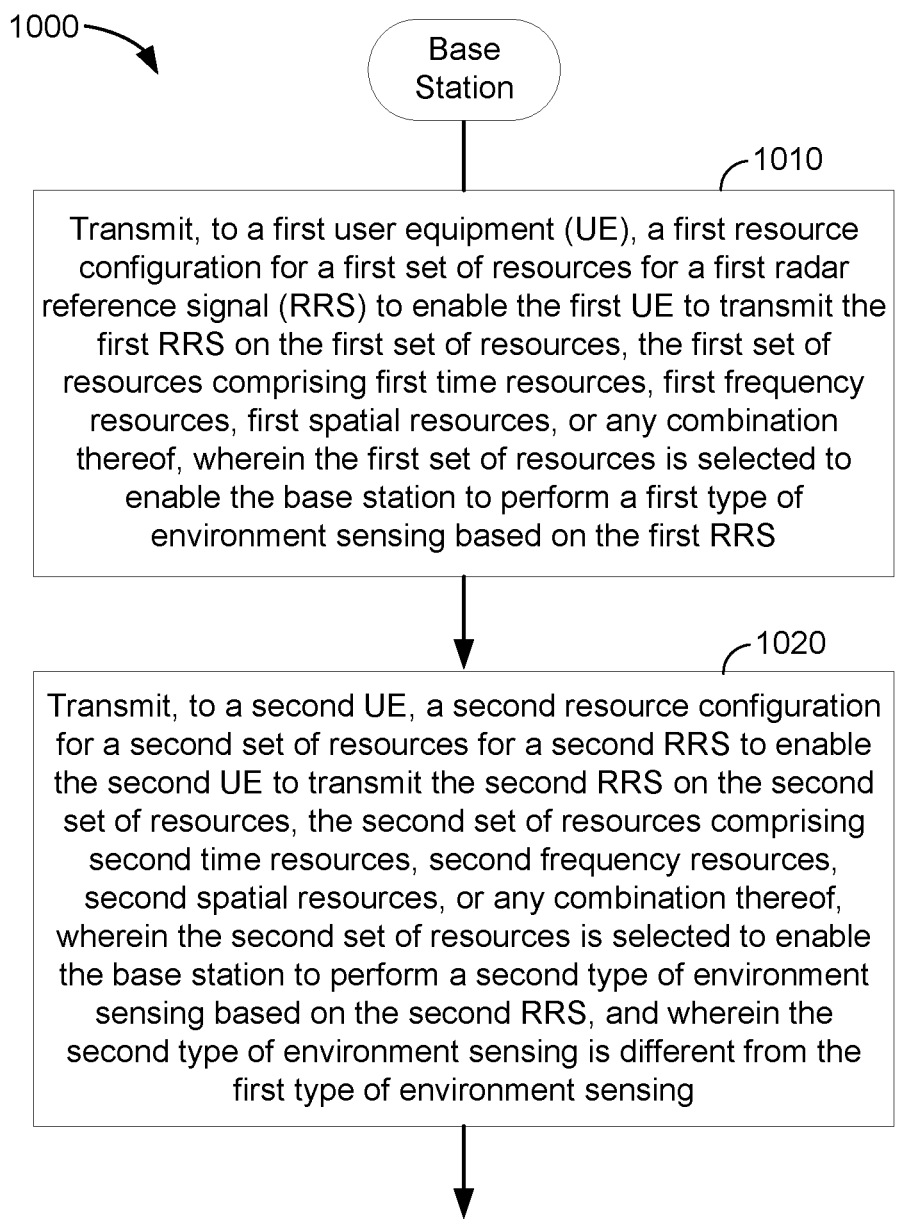

FIG. 10 illustrates an example method 1000 of allocating resources for environment sensing, according to aspects of the disclosure. In an aspect, method 1000 may be performed by a base station (e.g., any of the base stations described herein).

At 1010, the base station transmits, to a first UE (e.g., any of the UEs described herein), a first resource configuration for a first set of resources for a first RRS to enable the first UE to transmit the first RRS on the first set of resources, the first set of resources comprising first time resources, first frequency resources, first spatial resources, or any combination thereof, wherein the first set of resources is selected to enable the base station to perform a first type of environment sensing based on the first RRS. In an aspect, operation 1010 may be performed by the one or more WWAN transceivers 350, the one or more processors 384, memory 386, and/or sensing component 388, any or all of which may be considered means for performing this operation.

At 1020, the base station transmits, to a second UE (e.g., any of the UEs described herein), a second resource configuration for a second set of resources for a second RRS to enable the second UE to transmit the second RRS on the second set of resources, the second set of resources comprising second time resources, second frequency resources, second spatial resources, or any combination thereof, wherein the second set of resources is selected to enable the base station to perform a second type of environment sensing based on the second RRS, wherein the second set of resources is different from the first set of resources, and wherein the second type of environment sensing is different from the first type of environment sensing. In an aspect, operation 1020 may be performed by the one or more WWAN transceivers 350, the one or more processors 384, memory 386, and/or sensing component 388, any or all of which may be considered means for performing this operation.

Figure 11:
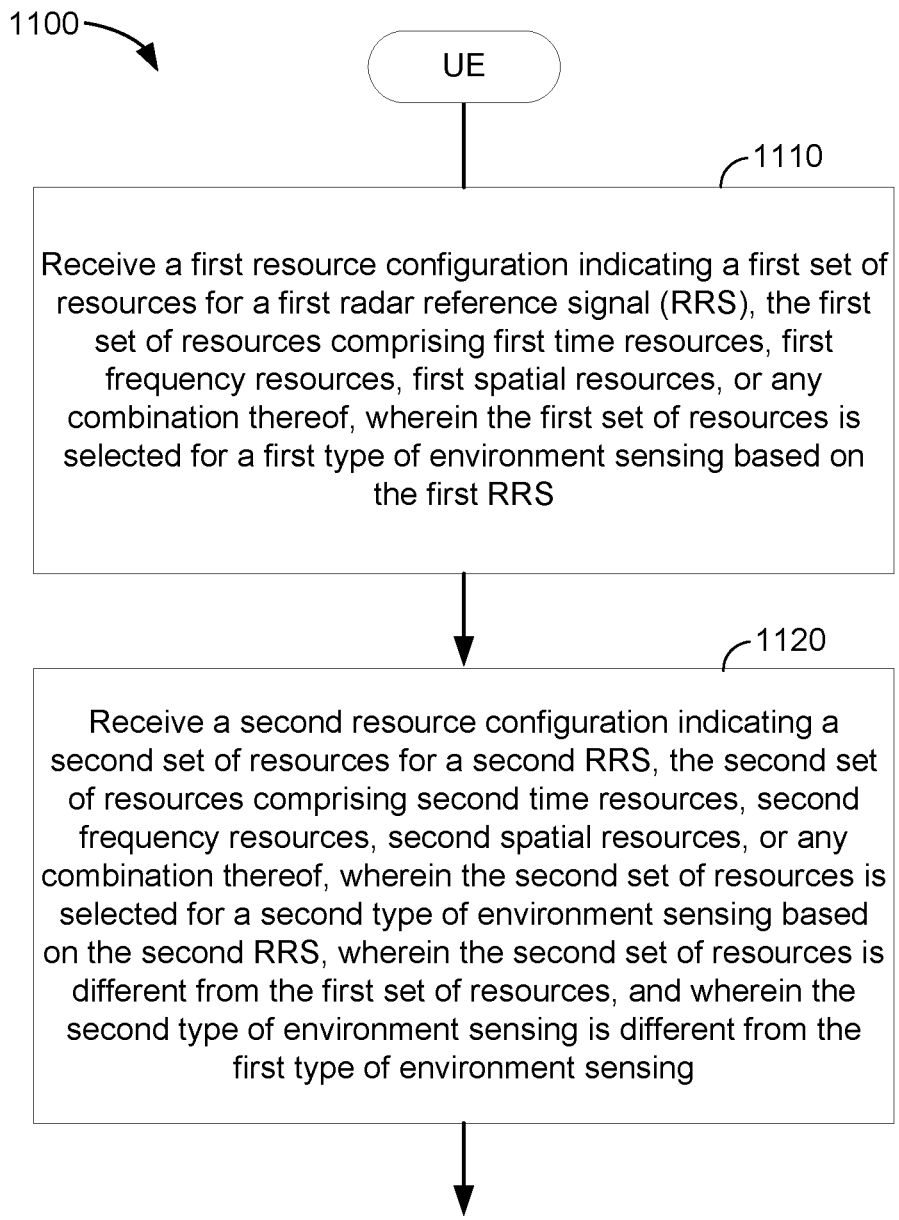
FIG. 11 illustrates an example method of environment sensing, according to aspects of the disclosure.

FIG. 11 illustrates an example method 1100 of environment sensing, according to aspects of the disclosure. In an aspect, method 1100 may be performed by a UE (e.g., any of the UEs described herein).

At 1110, the UE receives a first resource configuration indicating a first set of resources for a first RRS, the first set of resources comprising first time resources, first frequency resources, first spatial resources, or any combination thereof, wherein the first set of resources is selected for a first type of environment sensing based on the first RRS. In an aspect, operation 1110 may be performed by the one or more WWAN transceivers 310, the one or more processors 332, memory 340, and/or sensing component 342, any or all of which may be considered means for performing this operation.

At 1120, the UE receives a second resource configuration indicating a second set of resources for a second RRS, the second set of resources comprising second time resources, second frequency resources, second spatial resources, or any combination thereof, wherein the second set of resources is selected for a second type of environment sensing based on the second RRS, wherein the second set of resources is different from the first set of resources, and wherein the second type of environment sensing is different from the first type of environment sensing. In an aspect, operation 1120 may be performed by the one or more WWAN transceivers 310, the one or more processors 332, memory 340, and/or sensing component 342, any or all of which may be considered means for performing this operation.

As will be appreciated, a technical advantage of the methods 900 to 1100 is that the UE and base station can use RRS specific to the use case, and by using RRS optimized for the use case, performance is maximized.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of allocating resources for environment sensing performed by a base station, comprising: transmitting, to a first user equipment (UE), a first radar reference signal (RRS) on a first set of resources, the first set of resources comprising first time resources, first frequency resources, first spatial resources, or any combination thereof, wherein the first set of resources is selected to enable the first UE to perform a first type of environment sensing based on the first RRS; and transmitting, to a second UE, a second RRS on a second set of resources, the second set of resources comprising second time resources, second frequency resources, second spatial resources, or any combination thereof, wherein the second set of resources is selected to enable the second UE to perform a second type of environment sensing based on the second RRS, wherein the second set of resources is different from the first set of resources, and wherein the second type of environment sensing is different from the first type of environment sensing.

Clause 2. The method of clause 1, further comprising: transmitting, to the first UE, a first resource configuration indicating the first set of resources to enable the first UE to measure reflections of the first RRS; and transmitting, to the second UE, a second resource configuration indicating the second set of resources to enable the second UE to measure reflections of the second RRS.

Clause 3. The method of any of clauses 1 to 2, wherein: the first time resources comprise a first set of orthogonal frequency division multiplexing (OFDM) symbols, a first set of slots, a first set of subframes, or a first set of milliseconds, the first frequency resources comprise a first set of subcarriers, a first set of resource blocks, a first set of resource elements, or a first set of bandwidth parts, the first spatial resources comprise at least a first direction of one or more transmit beams on which the first RRS is transmitted, the second time resources comprise a second set of OFDM symbols, a second set of slots, a second set of subframes, or a second set of milliseconds, the second frequency resources comprise a second set of subcarriers, a second set of resource blocks, a second set of resource elements, or a second set of bandwidth parts, and the second spatial resources comprise at least a second direction of one or more transmit beams on which the second RRS is transmitted.

Clause 4. The method of any of clauses 1 to 3, wherein: the first set of resources have a first time domain density, frequency domain density, or both, and the second set of resources have a second time domain density, frequency domain density, or both.

Clause 5. The method of any of clauses 1 to 4, wherein: the first set of resources have a first periodicity, and the second set of resources have a second periodicity.

Clause 6. The method of any of clauses 1 to 5, wherein: transmission of the first RRS is periodic, semi-persistent, or aperiodic, and transmission of the second RRS is periodic, semi-persistent, or aperiodic.

Clause 7. The method of any of clauses 1 to 6, further comprising: receiving, from the first UE, a first request to transmit the first RRS; and receiving, from the second UE, a second request to transmit the second RRS.

Clause 8. The method of clause 7, wherein: the first request includes a first proposed resource configuration for the first set of resources, the second request includes a second proposed resource configuration for the second set of resources, or any combination thereof.

Clause 9. The method of clause 8, wherein: a first resource configuration for the first set of resources is based on the first proposed resource configuration, a second resource configuration for the second set of resources is based on the second proposed resource configuration, or any combination thereof.

Clause 10. The method of any of clauses 1 to 9, wherein: the first type of environment sensing is one of gesture recognition, vibration detection, or location detection, and the second type of environment sensing is a different one of gesture recognition, vibration detection, or location detection.

Clause 11. The method of any of clauses 1 to 10, wherein: the first UE and the second UE are the same UE, the first RRS is transmitted during a first time period, and the second RRS is transmitted during a second time period.

Clause 12. The method of clause 11, wherein the second time period at least partially overlaps the first time period.

Clause 13. The method of clause 11, wherein the second time period does not overlap the first time period.

Clause 14. A method of allocating resources for environment sensing performed by a base station, comprising: transmitting, to a first user equipment (UE), a first resource configuration for a first set of resources for a first radar reference signal (RRS) to enable the first UE to transmit the first RRS on the first set of resources, the first set of resources comprising first time resources, first frequency resources, first spatial resources, or any combination thereof, wherein the first set of resources is selected to enable the base station to perform a first type of environment sensing based on the first RRS; and transmitting, to a second UE, a second resource configuration for a second set of resources for a second RRS to enable the second UE to transmit the second RRS on the second set of resources, the second set of resources comprising second time resources, second frequency resources, second spatial resources, or any combination thereof, wherein the second set of resources is selected to enable the base station to perform a second type of environment sensing based on the second RRS, wherein the second set of resources is different from the first set of resources, and wherein the second type of environment sensing is different from the first type of environment sensing.

Clause 15. The method of clause 14, further comprising: measuring at least reflections of the first RRS to perform the first type of environment sensing; and measuring at least reflections of the second RRS to perform the second type of environment sensing.

Clause 16. The method of any of clauses 14 to 15, wherein: the first time resources comprise a first set of orthogonal frequency division multiplexing (OFDM) symbols, a first set of slots, a first set of subframes, or a first set of milliseconds, the first frequency resources comprise a first set of subcarriers, a first set of resource blocks, a first set of resource elements, or a first set of bandwidth parts, the first spatial resources comprise at least a first direction of one or more transmit beams on which the first RRS is transmitted, the second time resources comprise a second set of OFDM symbols, a second set of slots, a second set of subframes, or a second set of milliseconds, the second frequency resources comprise a second set of subcarriers, a second set of resource blocks, a second set of resource elements, or a second set of bandwidth parts, and the second spatial resources comprise at least a second direction of one or more transmit beams on which the second RRS is transmitted.

Clause 17. The method of any of clauses 14 to 16, wherein: the first set of resources have a first time domain density, a first frequency domain density, or both, and the second set of resources have a second time domain density, a second frequency domain density, or both.

Clause 18. The method of any of clauses 14 to 17, wherein: the first set of resources have a first periodicity, and the second set of resources have a second periodicity.

Clause 19. The method of any of clauses 14 to 18, wherein: transmission of the first RRS is periodic, semi-persistent, or aperiodic, and transmission of the second RRS is periodic, semi-persistent, or aperiodic.

Clause 20. The method of any of clauses 14 to 19, further comprising: receiving, from the first UE, a first request to transmit the first RRS; and receiving, from the second UE, a second request to transmit the second RRS.

Clause 21. The method of clause 20, wherein: the first request includes a first proposed resource configuration for the first set of resources, the second request includes a second proposed resource configuration for the second set of resources, or any combination thereof.

Clause 22. The method of clause 21, wherein: a first resource configuration for the first set of resources is based on the first proposed resource configuration, a second resource configuration for the second set of resources is based on the second proposed resource configuration, or any combination thereof.

Clause 23. The method of any of clauses 14 to 22, wherein: the first type of environment sensing is one of gesture recognition, vibration detection, or location detection, and the second type of environment sensing is a different one of gesture recognition, vibration detection, or location detection.

Clause 24. A method of environment sensing performed by a user equipment (UE), comprising: receiving a first resource configuration indicating a first set of resources for a first radar reference signal (RRS), the first set of resources comprising first time resources, first frequency resources, first spatial resources, or any combination thereof, wherein the first set of resources is selected for a first type of environment sensing based on the first RRS; and receiving a second resource configuration indicating a second set of resources for a second RRS, the second set of resources comprising second time resources, second frequency resources, second spatial resources, or any combination thereof, wherein the second set of resources is selected for a second type of environment sensing based on the second RRS, wherein the second set of resources is different from the first set of resources, and wherein the second type of environment sensing is different from the first type of environment sensing.

Clause 25. The method of clause 24, further comprising: receiving the first RRS on the first set of resources during a first time period; performing the first type of environment sensing based on the first RRS; receiving the second RRS on the second set of resources during a second time period; and performing the second type of environment sensing based on the second RRS.

Clause 26. The method of clause 25, wherein the second time period at least partially overlaps the first time period.

Clause 27. The method of clause 25, wherein the second time period does not overlap the first time period.

Clause 28. The method of clause 24, further comprising: transmitting the first RRS on the first set of resources during a first time period to enable a first base station to perform the first type of environment sensing; and transmitting the second RRS on the second set of resources during a second time period to enable a second base station to perform the second type of environment sensing.

Clause 29. The method of clause 28, wherein the first base station and the second base station are the same base station.

Clause 30. The method of clause 28, wherein the first base station and the second base station are different base stations.

Clause 31. The method of any of clauses 24 to 30, further comprising: transmitting a first request to a first base station for the first resource configuration; and transmitting a second request to a second base station for the second resource configuration.

Clause 32. The method of any of clauses 24 to 31, wherein: the first time resources comprise a first set of orthogonal frequency division multiplexing (OFDM) symbols, a first set of slots, a first set of subframes, or a first set of milliseconds, the first frequency resources comprise a first set of subcarriers, a first set of resource blocks, a first set of resource elements, or a first set of bandwidth parts, the first spatial resources comprise at least a first direction of one or more transmit beams on which the first RRS is transmitted the second time resources comprise a second set of OFDM symbols, a second set of slots, a second set of subframes, or a second set of milliseconds, the second frequency resources comprise a second set of subcarriers, a second set of resource blocks, a second set of resource elements, or a second set of bandwidth parts, and the second spatial resources comprise at least a second direction of one or more transmit beams on which the second RRS is transmitted.

Clause 33. The method of any of clauses 24 to 32, wherein: the first set of resources have a first time domain density, a first frequency domain density, or both, and the second set of resources have a second time domain density, a second frequency domain density, or both.

Clause 34. The method of any of clauses 24 to 33, wherein: the first set of resources have a first periodicity, and the second set of resources have a second periodicity.

Clause 35. The method of any of clauses 24 to 34, wherein: transmission of the first RRS is periodic, semi-persistent, or aperiodic, and transmission of the second RRS is periodic, semi-persistent, or aperiodic.

Clause 36. The method of any of clauses 24 to 35, wherein: the first type of environment sensing is one of gesture recognition, vibration detection, or location detection, and the second type of environment sensing is a different one of gesture recognition, vibration detection, or location detection.

Clause 37. An apparatus comprising a memory, at least one transceiver, and at least one processor communicatively coupled to the memory and the at least one transceiver, the memory, the at least one transceiver, and the at least one processor configured to perform a method according to any of clauses 1 to 36.

Clause 38. An apparatus comprising means for performing a method according to any of clauses 1 to 36.

Clause 39. A non-transitory computer-readable medium storing computer-executable instructions, the computer-executable comprising at least one instruction for causing a computer or processor to perform a method according to any of clauses 1 to 36.

Implementation examples for a non-transitory computer-readable medium are described in the following numbered clauses:

Clause 1. A non-transitory computer-readable medium storing computer-executable instructions that, when executed by a base station, cause the base station to: transmit, to a first user equipment (UE), a first radar reference signal (RRS) on a first set of resources, the first set of resources comprising first time resources, first frequency resources, first spatial resources, or any combination thereof, wherein the first set of resources is selected to enable the first UE to perform a first type of environment sensing based on the first RRS; and transmit, to a second UE, a second RRS on a second set of resources, the second set of resources comprising second time resources, second frequency resources, second spatial resources, or any combination thereof, wherein the second set of resources is selected to enable the second UE to perform a second type of environment sensing based on the second RRS, wherein the second set of resources is different from the first set of resources, and wherein the second type of environment sensing is different from the first type of environment sensing.

Clause 2. The non-transitory computer-readable medium of clause 1, wherein: the first time resources comprise a first set of orthogonal frequency division multiplexing (OFDM) symbols, a first set of slots, a first set of subframes, or a first set of milliseconds, the first frequency resources comprise a first set of subcarriers, a first set of resource blocks, a first set of resource elements, or a first set of bandwidth parts, the first spatial resources comprise at least a first direction of one or more transmit beams on which the first RRS is transmitted, the second time resources comprise a second set of OFDM symbols, a second set of slots, a second set of subframes, or a second set of milliseconds, the second frequency resources comprise a second set of subcarriers, a second set of resource blocks, a second set of resource elements, or a second set of bandwidth parts, and the second spatial resources comprise at least a second direction of one or more transmit beams on which the second RRS is transmitted.

Clause 3. The non-transitory computer-readable medium of clause 1, wherein: the first set of resources have a first time domain density, frequency domain density, or both, and the second set of resources have a second time domain density, frequency domain density, or both.

Clause 4. The non-transitory computer-readable medium of clause 1, wherein: the first set of resources have a first periodicity, and the second set of resources have a second periodicity.

Clause 5. The non-transitory computer-readable medium of clause 1, wherein: transmission of the first RRS is periodic, semi-persistent, or aperiodic, and transmission of the second RRS is periodic, semi-persistent, or aperiodic.

Clause 6. A non-transitory computer-readable medium storing computer-executable instructions that, when executed by a base station, cause the base station to: transmit, to a first user equipment (UE), a first resource configuration for a first set of resources for a first radar reference signal (RRS) to enable the first UE to transmit the first RRS on the first set of resources, the first set of resources comprising first time resources, first frequency resources, first spatial resources, or any combination thereof, wherein the first set of resources is selected to enable the base station to perform a first type of environment sensing based on the first RRS; and transmit, to a second UE, a second resource configuration for a second set of resources for a second RRS to enable the second UE to transmit the second RRS on the second set of resources, the second set of resources comprising second time resources, second frequency resources, second spatial resources, or any combination thereof, wherein the second set of resources is selected to enable the base station to perform a second type of environment sensing based on the second RRS, wherein the second set of resources is different from the first set of resources, and wherein the second type of environment sensing is different from the first type of environment sensing.

Clause 7. The non-transitory computer-readable medium of clause 6, wherein: the first time resources comprise a first set of orthogonal frequency division multiplexing (OFDM) symbols, a first set of slots, a first set of subframes, or a first set of milliseconds, the first frequency resources comprise a first set of subcarriers, a first set of resource blocks, a first set of resource elements, or a first set of bandwidth parts, the first spatial resources comprise at least a first direction of one or more transmit beams on which the first RRS is transmitted, the second time resources comprise a second set of OFDM symbols, a second set of slots, a second set of subframes, or a second set of milliseconds, the second frequency resources comprise a second set of subcarriers, a second set of resource blocks, a second set of resource elements, or a second set of bandwidth parts, and the second spatial resources comprise at least a second direction of one or more transmit beams on which the second RRS is transmitted.

Clause 8. The non-transitory computer-readable medium of clause 6, wherein: the first set of resources have a first time domain density, a first frequency domain density, or both, and the second set of resources have a second time domain density, a second frequency domain density, or both.

Clause 9. The non-transitory computer-readable medium of clause 6, wherein: the first set of resources have a first periodicity, and the second set of resources have a second periodicity.

Clause 10. The non-transitory computer-readable medium of clause 6, wherein: transmission of the first RRS is periodic, semi-persistent, or aperiodic, and transmission of the second RRS is periodic, semi-persistent, or aperiodic.

Clause 11. A non-transitory computer-readable medium storing computer-executable instructions that, when executed by a user equipment (UE), cause the UE to: receive a first resource configuration indicating a first set of resources for a first radar reference signal (RRS), the first set of resources comprising first time resources, first frequency resources, first spatial resources, or any combination thereof, wherein the first set of resources is selected for a first type of environment sensing based on the first RRS; and receive a second resource configuration indicating a second set of resources for a second RRS, the second set of resources comprising second time resources, second frequency resources, second spatial resources, or any combination thereof, wherein the second set of resources is selected for a second type of environment sensing based on the second RRS, wherein the second set of resources is different from the first set of resources, and wherein the second type of environment sensing is different from the first type of environment sensing.

Clause 12. The non-transitory computer-readable medium of clause 11, wherein: the first time resources comprise a first set of orthogonal frequency division multiplexing (OFDM) symbols, a first set of slots, a first set of subframes, or a first set of milliseconds, the first frequency resources comprise a first set of subcarriers, a first set of resource blocks, a first set of resource elements, or a first set of bandwidth parts, the first spatial resources comprise at least a first direction of one or more transmit beams on which the first RRS is transmitted, the second time resources comprise a second set of OFDM symbols, a second set of slots, a second set of subframes, or a second set of milliseconds, the second frequency resources comprise a second set of subcarriers, a second set of resource blocks, a second set of resource elements, or a second set of bandwidth parts, and the second spatial resources comprise at least a second direction of one or more transmit beams on which the second RRS is transmitted.

Clause 13. The non-transitory computer-readable medium of clause 11, wherein: the first set of resources have a first time domain density, a first frequency domain density, or both, and the second set of resources have a second time domain density, a second frequency domain density, or both.

Clause 14. The non-transitory computer-readable medium of clause 11, wherein: the first set of resources have a first periodicity, and the second set of resources have a second periodicity.

Clause 15. The non-transitory computer-readable medium of clause 11, wherein: transmission of the first RRS is periodic, semi-persistent, or aperiodic, and transmission of the second RRS is periodic, semi-persistent, or aperiodic.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of allocating resources for environment sensing performed by a base station, comprising:
   transmitting, to a first user equipment (UE), a first radar reference signal (RRS) on a first set of resources, the first set of resources comprising first time resources, first frequency resources, first spatial resources, or any combination thereof, wherein the first set of resources is selected to enable the first UE to perform a first type of environment sensing based on the first RRS, and wherein the first type of environment sensing is one of gesture recognition, vibration detection, or location detection; and
   transmitting, to a second UE, a second RRS on a second set of resources, the second set of resources comprising second time resources, second frequency resources, second spatial resources, or any combination thereof, wherein the second set of resources is selected to enable the second UE to perform a second type of environment sensing based on the second RRS, wherein the second set of resources is different from the first set of resources, wherein the second type of environment sensing is different from the first type of environment sensing, and wherein the second type of environment sensing is a different one of gesture recognition, vibration detection, or location detection.

2. The method of claim 1, further comprising:
   transmitting, to the first UE, a first resource configuration indicating the first set of resources to enable the first UE to measure reflections of the first RRS; and
   transmitting, to the second UE, a second resource configuration indicating the second set of resources to enable the second UE to measure reflections of the second RRS.

3. The method of claim 1, wherein:
   the first time resources comprise a first set of orthogonal frequency division multiplexing (OFDM) symbols, a first set of slots, a first set of subframes, or a first set of milliseconds,
   the first frequency resources comprise a first set of subcarriers, a first set of resource blocks, a first set of resource elements, or a first set of bandwidth parts,
   the first spatial resources comprise at least a first direction of one or more transmit beams on which the first RRS is transmitted,
   the second time resources comprise a second set of OFDM symbols, a second set of slots, a second set of subframes, or a second set of milliseconds,
   the second frequency resources comprise a second set of subcarriers, a second set of resource blocks, a second set of resource elements, or a second set of bandwidth parts, and
   the second spatial resources comprise at least a second direction of one or more transmit beams on which the second RRS is transmitted.

4. The method of claim 1, wherein:
   the first set of resources have a first time domain density, frequency domain density, or both, and
   the second set of resources have a second time domain density, frequency domain density, or both.

5. The method of claim 1, wherein:
   the first set of resources have a first periodicity, and
   the second set of resources have a second periodicity.

6. The method of claim 1, wherein:
   transmission of the first RRS is periodic, semi-persistent, or aperiodic, and
   transmission of the second RRS is periodic, semi-persistent, or aperiodic.

7. The method of claim 1, further comprising:
   receiving, from the first UE, a first request to transmit the first RRS; and
   receiving, from the second UE, a second request to transmit the second RRS.

8. The method of claim 7, wherein:
   the first request includes a first proposed resource configuration for the first set of resources,
   the second request includes a second proposed resource configuration for the second set of resources, or
   any combination thereof.

9. The method of claim 8, wherein:
   a first resource configuration for the first set of resources is based on the first proposed resource configuration,
   a second resource configuration for the second set of resources is based on the second proposed resource configuration, or
   any combination thereof.

10. The method of claim 1, wherein:
    the first UE and the second UE are the same UE,
    the first RRS is transmitted during a first time period, and
    the second RRS is transmitted during a second time period.

11. The method of claim 10, wherein the second time period at least partially overlaps the first time period.

12. The method of claim 10, wherein the second time period does not overlap the first time period.

13. A method of allocating resources for environment sensing performed by a base station, comprising:
    transmitting, to a first user equipment (UE), a first resource configuration for a first set of resources for a first radar reference signal (RRS) to enable the first UE to transmit the first RRS on the first set of resources, the first set of resources comprising first time resources, first frequency resources, first spatial resources, or any combination thereof, wherein the first set of resources is selected to enable the base station to perform a first type of environment sensing based on the first RRS, and wherein the first type of environment sensing is one of gesture recognition, vibration detection, or location detection; and transmitting, to a second UE, a second resource configuration for a second set of resources for a second RRS to enable the second UE to transmit the second RRS on the second set of resources, the second set of resources comprising second time resources, second frequency resources, second spatial resources, or any combination thereof, wherein the second set of resources is selected to enable the base station to perform a second type of environment sensing based on the second RRS, wherein the second set of resources is different from the first set of resources, wherein the second type of environment sensing is different from the first type of environment sensing, and wherein the second type of environment sensing is a different one of gesture recognition, vibration detection, or location detection.

14. The method of claim 13, further comprising:
measuring at least reflections of the first RRS to perform the first type of environment sensing; and
measuring at least reflections of the second RRS to perform the second type of environment sensing.

15. The method of claim 13, wherein:
the first time resources comprise a first set of orthogonal frequency division multiplexing (OFDM) symbols, a first set of slots, a first set of subframes, or a first set of milliseconds,
the first frequency resources comprise a first set of subcarriers, a first set of resource blocks, a first set of resource elements, or a first set of bandwidth parts,
the first spatial resources comprise at least a first direction of one or more transmit beams on which the first RRS is transmitted,
the second time resources comprise a second set of OFDM symbols, a second set of slots, a second set of subframes, or a second set of milliseconds,
the second frequency resources comprise a second set of subcarriers, a second set of resource blocks, a second set of resource elements, or a second set of bandwidth parts, and
the second spatial resources comprise at least a second direction of one or more transmit beams on which the second RRS is transmitted.

16. The method of claim 13, wherein:
the first set of resources have a first time domain density, a first frequency domain density, or both, and
the second set of resources have a second time domain density, a second frequency domain density, or both.

17. The method of claim 13, wherein:
the first set of resources have a first periodicity, and
the second set of resources have a second periodicity.

18. The method of claim 13, wherein:
transmission of the first RRS is periodic, semi-persistent, or aperiodic, and
transmission of the second RRS is periodic, semi-persistent, or aperiodic.

19. The method of claim 13, further comprising:
receiving, from the first UE, a first request to transmit the first RRS; and
receiving, from the second UE, a second request to transmit the second RRS.

20. The method of claim 19, wherein:
the first request includes a first proposed resource configuration for the first set of resources,
the second request includes a second proposed resource configuration for the second set of resources, or
any combination thereof.

21. The method of claim 20, wherein:
the first resource configuration for the first set of resources is based on the first proposed resource configuration,
the second resource configuration for the second set of resources is based on the second proposed resource configuration, or
any combination thereof.

22. A base station, comprising:
a memory;
at least one transceiver; and
at least one processor communicatively coupled to the memory and the at least one transceiver, the at least one processor configured to:
transmit, via the at least one transceiver, to a first user equipment (UE), a first radar reference signal (RRS) on a first set of resources, the first set of resources comprising first time resources, first frequency resources, first spatial resources, or any combination thereof, wherein the first set of resources is selected to enable the first UE to perform a first type of environment sensing based on the first RRS, and wherein the first type of environment sensing is one of gesture recognition, vibration detection, or location detection; and
transmit, via the at least one transceiver, to a second UE, a second RRS on a second set of resources, the second set of resources comprising second time resources, second frequency resources, second spatial resources, or any combination thereof, wherein the second set of resources is selected to enable the second UE to perform a second type of environment sensing based on the second RRS, wherein the second set of resources is different from the first set of resources, wherein the second type of environment sensing is different from the first type of environment sensing, and wherein the second type of environment sensing is a different one of gesture recognition, vibration detection, or location detection.

23. The base station of claim 22, wherein the at least one processor is further configured to:
transmit, via the at least one transceiver, to the first UE, a first resource configuration indicating the first set of resources to enable the first UE to measure reflections of the first RRS; and
transmit, via the at least one transceiver, to the second UE, a second resource configuration indicating the second set of resources to enable the second UE to measure reflections of the second RRS.

24. The base station of claim 22, wherein:
the first time resources comprise a first set of orthogonal frequency division multiplexing (OFDM) symbols, a first set of slots, a first set of subframes, or a first set of milliseconds,
the first frequency resources comprise a first set of subcarriers, a first set of resource blocks, a first set of resource elements, or a first set of bandwidth parts,
the first spatial resources comprise at least a first direction of one or more transmit beams on which the first RRS is transmitted,
the second time resources comprise a second set of OFDM symbols, a second set of slots, a second set of subframes, or a second set of milliseconds,
the second frequency resources comprise a second set of subcarriers, a second set of resource blocks, a second set of resource elements, or a second set of bandwidth parts, and the second spatial resources comprise at least a second direction of one or more transmit beams on which the second RRS is transmitted.

25. The base station of claim 22, wherein:
the first set of resources have a first time domain density, frequency domain density, or both, and
the second set of resources have a second time domain density, frequency domain density, or both.

26. The base station of claim 22, wherein:
the first set of resources have a first periodicity, and
the second set of resources have a second periodicity.

27. The base station of claim 22, wherein:
transmission of the first RRS is periodic, semi-persistent, or aperiodic, and
transmission of the second RRS is periodic, semi-persistent, or aperiodic.

28. The base station of claim 22, wherein the at least one processor is further configured to:
receive, via the at least one transceiver, from the first UE, a first request to transmit the first RRS; and
receive, via the at least one transceiver, from the second UE, a second request to transmit the second RRS.

29. The base station of claim 28, wherein:
the first request includes a first proposed resource configuration for the first set of resources,
the second request includes a second proposed resource configuration for the second set of resources, or
any combination thereof.

30. The base station of claim 29, wherein:
a first resource configuration for the first set of resources is based on the first proposed resource configuration,
a second resource configuration for the second set of resources is based on the second proposed resource configuration, or
any combination thereof.

31. The base station of claim 22, wherein:
the first UE and the second UE are the same UE,
the first RRS is transmitted during a first time period, and
the second RRS is transmitted during a second time period.

32. The base station of claim 31, wherein the second time period at least partially overlaps the first time period.

33. The base station of claim 31, wherein the second time period does not overlap the first time period.

34. A base station, comprising:
a memory;
at least one transceiver; and
at least one processor communicatively coupled to the memory and the at least one transceiver, the at least one processor configured to:
transmit, via the at least one transceiver, to a first user equipment (UE), a first resource configuration for a first set of resources for a first radar reference signal (RRS) to enable the first UE to transmit the first RRS on the first set of resources, the first set of resources comprising first time resources, first frequency resources, first spatial resources, or any combination thereof, wherein the first set of resources is selected to enable the base station to perform a first type of environment sensing based on the first RRS, and wherein the first type of environment sensing is one of gesture recognition, vibration detection, or location detection; and
transmit, via the at least one transceiver, to a second UE, a second resource configuration for a second set of resources for a second RRS to enable the second UE to transmit the second RRS on the second set of resources, the second set of resources comprising second time resources, second frequency resources, second spatial resources, or any combination thereof, wherein the second set of resources is selected to enable the base station to perform a second type of environment sensing based on the second RRS, wherein the second set of resources is different from the first set of resources, wherein the second type of environment sensing is different from the first type of environment sensing, and wherein the second type of environment sensing is a different one of gesture recognition, vibration detection, or location detection.

35. The base station of claim 34, wherein the at least one processor is further configured to:
measure at least reflections of the first RRS to perform the first type of environment sensing; and
measure at least reflections of the second RRS to perform the second type of environment sensing.

36. The base station of claim 34, wherein:
the first time resources comprise a first set of orthogonal frequency division multiplexing (OFDM) symbols, a first set of slots, a first set of subframes, or a first set of milliseconds,
the first frequency resources comprise a first set of subcarriers, a first set of resource blocks, a first set of resource elements, or a first set of bandwidth parts,
the first spatial resources comprise at least a first direction of one or more transmit beams on which the first RRS is transmitted,
the second time resources comprise a second set of OFDM symbols, a second set of slots, a second set of subframes, or a second set of milliseconds,
the second frequency resources comprise a second set of subcarriers, a second set of resource blocks, a second set of resource elements, or a second set of bandwidth parts, and
the second spatial resources comprise at least a second direction of one or more transmit beams on which the second RRS is transmitted.

37. The base station of claim 34, wherein:
the first set of resources have a first time domain density, a first frequency domain density, or both, and
the second set of resources have a second time domain density, a second frequency domain density, or both.

38. The base station of claim 34, wherein:
the first set of resources have a first periodicity, and
the second set of resources have a second periodicity.

39. The base station of claim 34, wherein:
transmission of the first RRS is periodic, semi-persistent, or aperiodic, and
transmission of the second RRS is periodic, semi-persistent, or aperiodic.

40. The base station of claim 34, wherein the at least one processor is further configured to:
receive, via the at least one transceiver, from the first UE, a first request to transmit the first RRS; and
receive, via the at least one transceiver, from the second UE, a second request to transmit the second RRS.

41. The base station of claim 40, wherein:
the first request includes a first proposed resource configuration for the first set of resources,
the second request includes a second proposed resource configuration for the second set of resources, or
any combination thereof.

42. The base station of claim 41, wherein:
the first resource configuration for the first set of resources is based on the first proposed resource configuration, the second resource configuration for the second set of resources is based on the second proposed resource configuration, or any combination thereof.

43. A base station, comprising:

means for transmitting, to a first user equipment (UE), a first radar reference signal (RRS) on a first set of resources, the first set of resources comprising first time resources, first frequency resources, first spatial resources, or any combination thereof, wherein the first set of resources is selected to enable the first UE to perform a first type of environment sensing based on the first RRS, and wherein the first type of environment sensing is one of gesture recognition, vibration detection, or location detection; and means for transmitting, to a second UE, a second RRS on a second set of resources, the second set of resources comprising second time resources, second frequency resources, second spatial resources, or any combination thereof, wherein the second set of resources is selected to enable the second UE to perform a second type of environment sensing based on the second RRS, wherein the second set of resources is different from the first set of resources, wherein the second type of environment sensing is different from the first type of environment sensing, and wherein the second type of environment sensing is a different one of gesture recognition, vibration detection, or location detection.

44. The base station of claim 43, further comprising:

means for transmitting, to the first UE, a first resource configuration indicating the first set of resources to enable the first UE to measure reflections of the first RRS; and means for transmitting, to the second UE, a second resource configuration indicating the second set of resources to enable the second UE to measure reflections of the second RRS.

45. The base station of claim 43, wherein:

the first set of resources have a first time domain density, frequency domain density, or both, and the second set of resources have a second time domain density, frequency domain density, or both.

46. The base station of claim 43, wherein:

the first set of resources have a first periodicity, and the second set of resources have a second periodicity.

47. The base station of claim 43, wherein:

transmission of the first RRS is periodic, semi-persistent, or aperiodic, and transmission of the second RRS is periodic, semi-persistent, or aperiodic.

48. The base station of claim 43, further comprising:

means for receiving, from the first UE, a first request to transmit the first RRS; and means for receiving, from the second UE, a second request to transmit the second RRS.

49. A base station, comprising:

means for transmitting, to a first user equipment (UE), a first resource configuration for a first set of resources for a first radar reference signal (RRS) to enable the first UE to transmit the first RRS on the first set of resources, the first set of resources comprising first time resources, first frequency resources, first spatial resources, or any combination thereof, wherein the first set of resources is selected to enable the base station to perform a first type of environment sensing based on the first RRS, and wherein the first type of environment sensing is one of gesture recognition, vibration detection, or location detection; and means for transmitting, to a second UE, a second resource configuration for a second set of resources for a second RRS to enable the second UE to transmit the second RRS on the second set of resources, the second set of resources comprising second time resources, second frequency resources, second spatial resources, or any combination thereof, wherein the second set of resources is selected to enable the base station to perform a second type of environment sensing based on the second RRS, wherein the second set of resources is different from the first set of resources, wherein the second type of environment sensing is different from the first type of environment sensing, and wherein the second type of environment sensing is a different one of gesture recognition, vibration detection, or location detection.

50. The base station of claim 49, wherein:

the first time resources comprise a first set of orthogonal frequency division multiplexing (OFDM) symbols, a first set of slots, a first set of subframes, or a first set of milliseconds, the first frequency resources comprise a first set of subcarriers, a first set of resource blocks, a first set of resource elements, or a first set of bandwidth parts, the first spatial resources comprise at least a first direction of one or more transmit beams on which the first RRS is transmitted, the second time resources comprise a second set of OFDM symbols, a second set of slots, a second set of subframes, or a second set of milliseconds, the second frequency resources comprise a second set of subcarriers, a second set of resource blocks, a second set of resource elements, or a second set of bandwidth parts, and the second spatial resources comprise at least a second direction of one or more transmit beams on which the second RRS is transmitted.

51. The base station of claim 49, wherein:

the first set of resources have a first time domain density, a first frequency domain density, or both, and the second set of resources have a second time domain density, a second frequency domain density, or both.

52. The base station of claim 49, wherein:

the first set of resources have a first periodicity, and the second set of resources have a second periodicity.

53. The base station of claim 49, wherein:

transmission of the first RRS is periodic, semi-persistent, or aperiodic, and transmission of the second RRS is periodic, semi-persistent, or aperiodic.

* * * * *